United States Patent [19]

Yamashita et al.

[11] Patent Number: 5,539,343

[45] Date of Patent: Jul. 23, 1996

[54] HORIZONTAL SYNCHRONIZING SIGNAL GENERATING CIRCUIT

[75] Inventors: Shinji Yamashita; Yoshihiro Inada; Miki Nishimoto, all of Itami, Japan

[73] Assignees: Mitsubishi Electric Semiconductor Software Corporation, Itami; Mitsubishi Denki Kabushiki Kaisha, Tokyo, both of Japan

[21] Appl. No.: 416,212

[22] Filed: Apr. 4, 1995

[30] Foreign Application Priority Data

Jun. 30, 1994 [JP] Japan .................... 6-149750

[51] Int. Cl.$^6$ ...................... H03L 7/06
[52] U.S. Cl. ............ 327/142; 327/151; 327/154; 327/155; 327/160; 348/524; 348/531; 348/541
[58] Field of Search ............. 327/142, 151, 327/154, 155, 160; 348/465, 531, 524, 540–1

[56] References Cited

U.S. PATENT DOCUMENTS

| 4,169,659 | 10/1979 | Marlowe | 358/150 |
| 4,672,447 | 6/1987 | Möring et al. | 358/148 |
| 4,675,734 | 6/1987 | Widom | 358/153 |
| 4,722,007 | 1/1988 | Fling | 348/524 |
| 4,876,589 | 10/1989 | Orsburn et al. | 358/22 |
| 5,162,910 | 11/1992 | Willis | 348/524 |
| 5,272,532 | 12/1993 | Akiba | 358/158 |
| 5,404,172 | 4/1995 | Berman et al. | 348/465 |

FOREIGN PATENT DOCUMENTS 2268656  1/1994  United Kingdom .

OTHER PUBLICATIONS

"Transistor Gijyutsu special No. 5" pp. 92–93 Sep. 10, 1987.

*Primary Examiner*—Margaret Rose Wambach
*Attorney, Agent, or Firm*—Oblon, Spivak, McClelland, Maier & Neustadt

[57] ABSTRACT

There is disclosed a horizontal synchronizing signal generating circuit for generating a horizontal synchronizing signal which has no frequency variations and which is in phase with an entered composite synchronizing signal if the entered composite synchronizing signal is a nonstandard signal having a varying horizontal frequency. A horizontal counter circuit (5) counts a reference clock ($V_{CL}$), and a window pulse generating circuit (4) outputs a window pulse signal ($V_W$) which is low for a fixed time period when a counter output ($V_{CT}$) equals a counter value (878) indicative of a standard output timing. A horizontal synchronizing signal separating circuit (1) outputs a horizontal synchronizing signal ($V_2$) only when the composite synchronizing signal ($V_1$) falls within the fixed time period. Then a horizontal phase judging circuit (2) outputs a standard signal flag ($V_3$) and a synchronizing signal generating circuit (3) outputs the horizontal synchronizing signal ($V_2$) in synchronism with the reference clock ($V_{CL}$). When the composite synchronizing signal ($V_1$) does not fall within the fixed time period, the horizontal phase judging circuit (2) outputs a nonstandard signal flag ($V_3$), and the synchronizing signal generating circuit (3) outputs a horizontal synchronizing signal ($V_4$) produced from the window pulse signal ($V_W$).

11 Claims, 24 Drawing Sheets

BL1

BL2

BL3

HORIZONTAL SYNCHRONIZING SIGNAL GENERATING CIRCUIT

BACKGROUND OF THE INVENTION

1. Field of the Invention

The present invention relates to a circuit for generating a horizontal synchronizing signal having a horizontal frequency determined by video synchronizing signal standards from a composite synchronizing signal.

2. Description of the Background Art

FIG. 24 illustrates a conventional horizontal synchronizing signal generating circuit which is disclosed in "Transistor Gijyutsu Special No. 5, P. 92, published on Sep. 10, 1987, CQ Publishing & Co., Ltd."

Referring to FIG. 24, the reference numerals 71, 73, 74, 77 designate inverter circuits; 72 designates a resistor; 70 designates a capacitor; 75, 79, 80 designate flip-flop circuits; 76 designates a 4-bit counter circuit; and 78 designates an NAND circuit.

In operation, a clock (small-signal sine wave) entered at an input terminal Te is subjected to the removal of DC elements therefrom by the capacitor 70, amplified by an amplifier including the resistor 72 and the inverter circuit 71, and then waveform-shaped by the inverter circuit 73 into a rectangular-wave clock.

Then the clock is frequency-divided by two by the flip-flop circuit 75, and the frequency-divided clock is entered into the counter circuit 76. The counter circuit 76 performs a count-up operation in synchronism with the entered clock. Outputs from the counter circuit 76 are applied to the NAND circuit 78. The NAND circuit 78 decodes the outputs from the counter circuit 76 and drives its output low just at the time when the counter value becomes $E_H$. An output signal from the NAND circuit 78 resets the flip-flop 79. After the reset is cancelled, an output Q of the flip-flop circuit 79 is set to "H" at the falling edge of a composite synchronizing signal entered at an input terminal Td and polarity-inverted by the inverter circuit 74. An output Q of the flip-flop circuit 80 on the next stage is set to "H" level at the rising edge of an output signal from the flip-flop circuit 79. At the same time, the output signal from the flip-flop circuit 79 cancels a reset signal of the counter circuit 76, pertaining the counter circuit 76 to restart the counter operation.

The least significant bit signal in a count output signal from the counter circuit 76 is entered into the inverter circuit 77 which in turn inverts the polarity of the least significant bit signal to input the inverted signal to a reset terminal R of the flip-flop circuit 80. Consequently, the flip-flop circuit 80 is reset just at the time when the count value becomes $1_H$ after the restart of the count operation of the counter circuit 76. The above described sequence of operations are carried out successively, and a horizontal synchronizing signal is outputted from an output terminal Tf of the flip-flop circuit 80.

In the conventional circuit arrangement, however, the stability of the horizontal synchronizing signal to be generated depends on the states of the entered composite synchronizing signal. That is, when the horizontal frequency of the entered composite synchronizing signal is varied in such a manner that it is higher or lower than the horizontal frequency determined by the video synchronizing signal standards (the composite synchronizing signal at this time is referred to as a nonstandard signal), the horizontal frequency of the generated horizontal synchronizing signal also varies relative to the horizontal frequency of the video synchronizing signal standards since the horizontal synchronizing signal is generated in synchronism with the detected falling edge of the entered composite synchronizing signal as above stated.

Further, the conventional circuit has the drawback that the horizontal synchronizing signal is not generated in the absence of the composite synchronizing signal. Therefore, it has been desired to accomplish a circuit which can generate the horizontal synchronizing signal with high stability in the absence of the composite synchronizing signal.

SUMMARY OF THE INVENTION

According to the present invention, a horizontal synchronizing signal generating circuit comprises: first input means for receiving a composite synchronizing signal; second input means for receiving a reference clock; judging means connected to the first input means for judging whether or not the composite synchronizing signal falls within a first time period determined so that the midpoint of the first time period is a falling edge of a standard horizontal synchronizing signal to output a judgement signal, the judgement signal indicating that the composite synchronizing signal is the standard horizontal synchronizing signal when the composite synchronizing signal falls, the judgement signal indicating that the composite synchronizing signal is a nonstandard horizontal synchronizing signal when the composite synchronizing signal does not fall; internal signal generating means connected to the second input means and the judging means, the internal signal generating means synchronizing the composite synchronizing signal with the reference clock to output a horizontal synchronizing signal when the judgement signal indicates the standard horizontal synchronizing signal, the internal signal generating means generating the standard horizontal synchronizing signal to output the standard horizontal synchronizing signal as the horizontal synchronizing signal in response to the reference clock when the judgement signal indicates the nonstandard horizontal synchronizing signal; and output means connected to the internal signal generating means for outputting the horizontal synchronizing signal, wherein the standard horizontal synchronizing signal has a horizontal frequency determined by video synchronizing signal standards.

The judging means judges that the composite synchronizing signal is the standard horizontal synchronizing signal when it detects the falling edge of the entered composite synchronizing signal within the first time period. On receipt of the judgement result, the internal signal generating means synchronizes the composite synchronizing signal with the reference clock to output the horizontal synchronizing signal.

On the other hand, the judging means judges that the composite synchronizing signal is the nonstandard horizontal synchronizing signal when it does not detect the falling edge of the composite synchronizing signal within the first time period. That is, the judging means judges that no falling edge within the first time period means the composite synchronizing signal having the horizontal frequency which is not determined by video synchronizing signal standards or the absence of the composite synchronizing signal. On receipt of the result, the internal signal generating means generates the standard horizontal synchronizing signal by itself to output the generated standard horizontal synchronizing signal in response to the reference clock as the horizontal synchronizing signal.

Therefore, the outputted horizontal synchronizing signal, whether standard or nonstandard, has the horizontal frequency determined by the video synchronizing signal standards, and the output timing thereof is controlled by the reference clock.

In this manner, separate processes for generating the horizontal synchronizing signal are employed depending on whether the standard horizontal synchronizing signal or the nonstandard horizontal synchronizing signal is entered. That is, the horizontal synchronizing signal in phase with the composite synchronizing signal is outputted when the standard horizontal synchronizing signal is entered, and the standard horizontal synchronizing signal (in phase with the composite synchronizing signal) generated by the internal signal generating means is outputted as the horizontal synchronizing signal when the nonstandard horizontal synchronizing signal is entered. The present invention thus provides a stable horizontal synchronizing signal which has no phase difference from the composite synchronizing signal and no frequency variation.

Preferably the internal signal generating means includes: window pulse signal generating means connected to the second input means and triggered by a falling edge of the horizontal synchronizing signal to generate and output a window pulse signal in response to the reference clock, the window pulse signal being low over the first time period; and synchronizing signal generating means connected to the second input means, the judging means, the window pulse signal generating means, and the output means for outputting the horizontal synchronizing signal to the output means and the window pulse signal generating means, the outputted horizontal synchronizing signal being the composite synchronizing signal in synchronism with the reference clock when the judgement signal indicates the standard horizontal synchronizing signal, the outputted horizontal synchronizing signal being the standard horizontal synchronizing signal in synchronism with the window pulse signal when the judgement signal indicates the nonstandard horizontal synchronizing signal, and the judging means is connected to the window pulse signal generating means and judges the falling edge of the composite synchronizing signal in response to the window pulse signal.

The window pulse signal generating means generates the window pulse signal to output the window pulse signal to the judging means and the synchronizing signal generating means with the output timing determined in response to the reference clock. The judging means judges in response to the entered window pulse signal whether or not the composite synchronizing signal falls within the first time period the midpoint of which is the falling edge of the standard horizontal synchronizing signal, that is, whether the composite synchronizing signal is the standard signal or the nonstandard signal. On receipt of the judgement result, the synchronizing signal generating means generates and outputs the horizontal synchronizing signal. When the judgement signal indicates the entry of the standard horizontal synchronizing signal, the synchronizing signal generating means synchronizes the composite synchronizing signal with the reference clock to output the horizontal synchronizing signal to the output means and the window pulse signal generating means. On receipt of the outputted horizontal synchronizing signal, i.e. the falling edge of the standard horizontal synchronizing signal, the window pulse signal generating means generates the window pulse signal in response to the reference clock to output the window pulse signal.

On the other hand, when the judgment signal indicates the nonstandard horizontal synchronizing signal, the synchronizing signal generating means generates the standard horizontal synchronizing signal by itself to output the standard horizontal synchronizing signal as the horizontal synchronizing signal in response to the window pulse signal. Since the window pulse signal is outputted in response to the reference clock, the output timing of the horizontal synchronizing signal is also controlled by the reference clock. The window pulse is generated on receipt of the falling edge of the standard horizontal synchronizing signal outputted from the synchronizing signal generating means.

Whether the composite synchronizing signal is the standard horizontal synchronizing signal or the nonstandard horizontal synchronizing signal is determined by means of the window pulse signal. The window pulse signal is generated in response to the reference clock on receipt of the falling edge of the horizontal synchronizing signal. This prevents the absence of the horizontal synchronizing signal and suppresses variations in horizontal frequency, providing the horizontal synchronizing signal in phase with the composite synchronizing signal.

Preferably the synchronizing signal generating means includes: a first horizontal synchronizing signal generating circuit portion responsive to the window pulse signal and the reference clock for synchronizing the composite synchronizing signal with the reference clock; a second horizontal synchronizing signal generating circuit portion responsive to the window pulse signal and the reference clock for generating the standard horizontal synchronizing signal in synchronism with the reference clock; and selector means connected to the first and second horizontal synchronizing signal generating circuit portions and the judging means, the selector means selecting an output signal frown the first horizontal synchronizing signal generating circuit portion when the judgement signal indicates the standard horizontal synchronizing signal, the selector means selecting an output signal from the second horizontal synchronizing signal generating circuit portion when the judgement signal indicates the nonstandard horizontal synchronizing signal, the selector means then outputting the selected signal as the horizontal synchronizing signal.

Preferably, the window pulse signal generating means includes: counter means connected to the second input means and the synchronizing signal generating means for counting the reference clock after being reset by the horizontal synchronizing signal; and a window pulse signal generating circuit connected to the counter means and the synchronizing signal generating means for starting outputting the window pulse signal when the count result equals a preset value after the falling edge of the horizontal synchronizing signal.

The counter means counts the reference clock to output the count value to the window pulse signal generating circuit. The window pulse signal generating circuit compares the count result from the counter means with the set value to start outputting the window pulse signal which is low over the first time period when the count result equals the set value.

This provides the constant output of the window pulse signal which is low at a predetermined time point, thereby accomplishing the stable horizontal synchronizing signal in phase with the composite synchronizing signal.

Preferably the horizontal synchronizing signal generating circuit further comprises: phase difference detecting means connected to the first input means and the window pulse signal generating circuit for comparing both phases of the composite synchronizing signal and the window pulse signal to output a phase difference judgment signal indicative of the sign of a phase difference therebetween to the window pulse signal generating circuit, wherein the window pulse signal generating circuit stores a predetermined second time period and changes an output start timing of the window pulse signal by the second time period in response to the phase difference judgement signal.

The composite synchronizing signal entered at the first input means is applied to not only the judging means but also the phase difference detecting means. The window pulse signal generating circuit outputs the window pulse signal also to the phase difference detecting means. The phase difference detecting means compares the phases of both the signals to judge whether the phase difference is plus or minus. The phase difference detecting means outputs the judgement result as the phase difference judgement signal to the window pulse signal generating circuit.

The window pulse signal generating circuit causes the output start timing of the window pulse signal to lead or lag by the second time period in accordance with the sign of the phase difference indicated by the phase difference judgement signal.

It is now assumed that the entered composite synchronizing signal changes from the nonstandard signal to the standard signal. The window pulse signal is in synchronism with the composite synchronizing signal which has been the nonstandard signal. By detecting the sign of the phase difference between the composite synchronizing signal changed to the standard signal and the window pulse signal, it is detected whether the phase of the composite synchronizing signal leads or lags behind the phase of the window pulse signal. The window pulse signal generating circuit changes the output start timing of the window pulse signal in accordance with the detection result, allowing the outputted window pulse signal to follow the change of the entered composite synchronizing signal.

The output start timing of the window pulse signal may be changed by the second time period in response to the phase difference judgement signal. This permits the phase of the horizontal synchronizing signal to follow the phase of the composite synchronizing signal if the composite synchronizing signal changes from the nonstandard signal to the standard signal. Therefore, the present invention prevents the absence of the horizontal synchronizing signal and suppresses the variations in horizontal frequency to provide the horizontal synchronizing signal in phase with the composite synchronizing signal in the case of the changes from the nonstandard signal to the standard signal.

Preferably the horizontal synchronizing signal generating circuit further comprises: window pulse output timing correcting means connected to the phase difference detecting means and the window pulse signal generating circuit for determining the absolute value of the phase difference between the composite synchronizing signal and the window pulse signal and for determining a correction signal indicative of a third time period in accordance with the absolute value of the phase difference to output the correction signal to the window pulse signal generating circuit, wherein the window pulse signal generating circuit changes the output start timing of the window pulse signal by the third time period in response to the phase difference judgement signal and the correction signal.

The window pulse output timing correcting means determines the absolute value of the phase difference between the entered composite synchronizing signal and the window pulse signal to determine the third time period in accordance with the absolute value. The window pulse output timing correcting means then outputs the correction signal indicative of the third time period to the window pulse signal generating circuit.

The window pulse signal generating circuit changes the output start timing in such a manner that the third time period indicated by the correction signal is added to or subtracted from the output start timing of the window pulse signal determined from the count result of the counter means in accordance with the sign of the phase difference from the phase difference detecting means.

In this manner, the value of the phase difference, as well as the sign thereof, is determined to quantitatively control the correction amount (third time period) of the output start timing. Thus, the corrected window pulse signal outputted from the window pulse signal generating circuit constantly follows the changes of the entered composite synchronizing signal.

The correction amount of the output start timing, or the third time period, of the window pulse signal may be controlled in accordance with the phase difference amount. This further ensures the phase of the horizontal synchronizing signal to follow the phase of the composite synchronizing signal when the composite synchronizing signal changes from the nonstandard signal to the standard signal, reliably providing the frequency-stable horizonal synchronizing signal in phase with the composite synchronizing signal.

Preferably the judging means includes: horizontal synchronizing signal separating means connected to the first input means, the window pulse signal generating circuit, and the synchronizing signal generating means for outputting a separated horizontal synchronizing signal in synchronism with the falling edge of the composite synchronizing signal only when the falling edge of the composite synchronizing signal exists within the first time period; and a horizontal phase judging circuit connected to the horizontal synchronizing signal separating means, the window pulse signal generating circuit, and the synchronizing signal generating means and receiving the separated horizontal synchronizing signal for generating the judgement signal indicating that the composite synchronizing signal is the horizontal synchronizing signal in response to the window pulse signal to output the judgement signal to the synchronizing signal generating means.

The composite synchronizing signal entered at the first input means is applied to the phase difference detecting means and the horizontal synchronizing signal separating circuit. The horizontal synchronizing signal separating circuit detects whether or not the composite synchronizing signal falls within the first time period over which the entered window pulse signal is low. Only when the falling edge is detected, the horizontal synchronizing signal separating circuit separates the horizontal synchronizing signal from the composite synchronizing signal to output the horizontal synchronizing signal to the horizontal phase judging circuit.

The horizontal phase judging circuit outputs the judgement signal indicating that the composite synchronizing signal is the standard horizontal synchronizing signal to the synchronizing signal generating means only when it receives the separated horizontal synchronizing signal. The synchronizing signal generating means identifies the composite synchronizing signal as the standard or nonstandard signal by means of the judgement signal.

The provision of the horizontal synchronizing signal separating circuit and the horizontal phase judging circuit ensures the horizontal synchronizing signal to be separated from the composite synchronizing signal only when the composite synchronizing signal is the standard signal.

Preferably the phase difference detecting means includes: a horizontal synchronizing signal input timing detecting circuit connected to the first input means and the synchronizing signal generating means for detecting the falling edge of the composite synchronizing signal entered, after being subjected to an initial reset by the falling edge of the horizontal synchronizing signal, to output a horizontal synchronization flag signal indicating that the composite synchronizing signal is the horizontal synchronizing signal; and a phase detecting circuit connected to the horizontal synchronizing signal input timing detecting circuit and the window pulse signal generating circuit for comparing the horizontal synchronization flag signal with the window pulse signal to output the phase difference judgement signal, and the window pulse output timing correcting means is connected to an output of the horizontal synchronizing signal input timing detecting circuit.

The horizontal synchronizing signal input timing detecting circuit is subjected to the initial reset in response to the falling edge of the horizontal synchronizing signal outputted from the synchronizing signal generating means. Then the horizontal synchronizing signal input timing detecting circuit outputs to the phase detecting circuit the horizontal synchronization flag signal indicative of the entry of the horizontal synchronizing signal at the falling edge of the entered composite synchronizing signal, whether the composite synchronizing signal may be the standard signal or the nonstandard signal.

The phase detecting circuit compares the phases of the entered horizontal synchronization flag signal and the window pulse signal from the window pulse signal generating circuit to detect the sign of the phase difference.

The sign of the phase difference is correctly detected, and the output start timing correction of the window pulse signal by the second time period is reliably accomplished.

According to another aspect of the present invention, a horizontal synchronizing signal generating circuit for generating a horizontal synchronizing signal from an entered composite synchronizing signal and a reference clock, comprises: window pulse signal generating means for generating and outputting a window pulse signal in synchronism with the reference clock, the window pulse signal being low over a predetermined time period defined so that the midpoint of the predetermined time period is a falling edge of a standard horizontal synchronizing signal having a horizontal frequency determined by video synchronizing signal standards; judging means for comparing the entered composite synchronizing signal with the window pulse signal to judge whether or not a falling edge of the composite synchronizing signal exists within the predetermined time period; and synchronizing signal generating means, when the judging means judges that it does not, for generating the standard horizontal synchronizing signal in response to the reference clock and the window pulse signal to output the standard horizontal synchronizing signal as the horizontal synchronizing signal, wherein the window pulse signal generating means starts generating the window pulse signal in response to the horizontal synchronizing signal outputted from the synchronizing signal generating means.

In this aspect, the judging means judges whether or not the entered composite synchronizing signal falls within the time period over which the entered window pulse signal is low. When it is judged that it does not, the internal signal generating means, on receipt of the judgement result, internally generates the standard horizontal synchronizing signal in response to the window pulse signal to output the horizontal synchronizing signal.

If the composite synchronizing signal which is the nonstandard signal is entered, the standard horizontal synchronizing signal (in phase with the composite synchronizing signal) generated by the internal signal generating means is outputted as the horizontal synchronizing signal. In addition, the outputted horizontal synchronizing signal is in phase with the composite synchronizing signal, has no variations in frequency, and has the horizonal frequency determined by the video synchronizing signal standards.

Preferably the horizontal synchronizing signal generating circuit further comprises: first correction signal generating means for detecting the sign of a phase difference between the composite synchronizing signal and the window pulse signal to output a first correction signal indicative of the detection result to the window pulse signal generating means, wherein the window pulse signal generating means corrects an output timing of the window pulse signal in response to the first correction signal to generate and output the window pulse signal, and wherein the synchronizing signal generating means, when the judging means judges that it exists, synchronizes the entered composite synchronizing signal with the reference clock to output the horizontal synchronizing signal.

The first correction signal generating means detects the sign of the phase difference between the composite synchronizing signal and the window pulse signal to output the detection result as the first correction signal. On receipt of the first correction signal, the window pulse signal generating means corrects the output timing of the window pulse signal by the correction amount in response to the first correction signal to output the corrected window pulse signal to the judging means. This permits the corrected window pulse signal to follow the changes of the entered composite synchronizing signal.

If the composite synchronizing signal changes from the nonstandard signal to the standard signal, the generated horizontal synchronizing signal may follow the change. This prevents the absence of the horizontal synchronizing signal and suppresses the variations in horizontal frequency, providing the horizontal synchronizing signal in phase with the composite synchronizing signal.

Preferably the horizontal synchronizing signal generating circuit further comprises: second correction signal generating means for determining the amount of the phase difference between the composite synchronizing signal and the window pulse signal to output a second correction signal to the window pulse signal generating means, the second correction signal indicating the amount of correction of the output timing of the window pulse signal in accordance with the amount of the phase difference, wherein the window pulse signal generating means corrects the output timing of the window pulse signal in response to the first and second correction signals to generate and output the window pulse signal.

The second correction signal generating means determines the amount of phase difference between the composite synchronizing signal and the window pulse signal to output the amount of correction in accordance with the amount of phase difference as the second correction signal to the window pulse signal generating means. On receipt of the second correction signal, the window pulse signal generating means corrects the output timing of the window pulse signal in response to the first and second correction signals.

If the composite synchronizing signal changes from the nonstandard signal to the standard signal, the generated horizontal synchronizing signal may follow the change more correctly. This prevents the absence of the horizontal synchronizing signal and suppresses the variations in horizontal frequency, ensuring the horizontal synchronizing signal in phase with the composite synchronizing signal.

It is a primary object of the present invention to constantly generate a horizontal synchronizing signal having a horizontal frequency determined by video synchronizing signal standards if the horizontal frequency of an entered composite synchronizing signal is varied relative to the value determined by the video synchronizing signal standards or if the composite synchronizing signal is absent.

It is a secondary object of the present invention to generate a horizontal synchronizing signal which follows the change, if occurs, of an entered composite synchronizing signal from a nonstandard signal to a standard signal (having a horizontal frequency conforming to the video synchronizing signal standards), and which has a horizontal frequency correctly conforming to the video synchronizing signal standards.

These and other objects, features, aspects and advantages of the present invention will become more apparent from the following detailed description of the present invention when taken in conjunction with the accompanying drawings.

DESCRIPTION OF THE PREFERRED EMBODIMENTS

First to third preferred embodiments of the present invention will now be described with reference to the drawings.

First Preferred Embodiment

Figure 1:
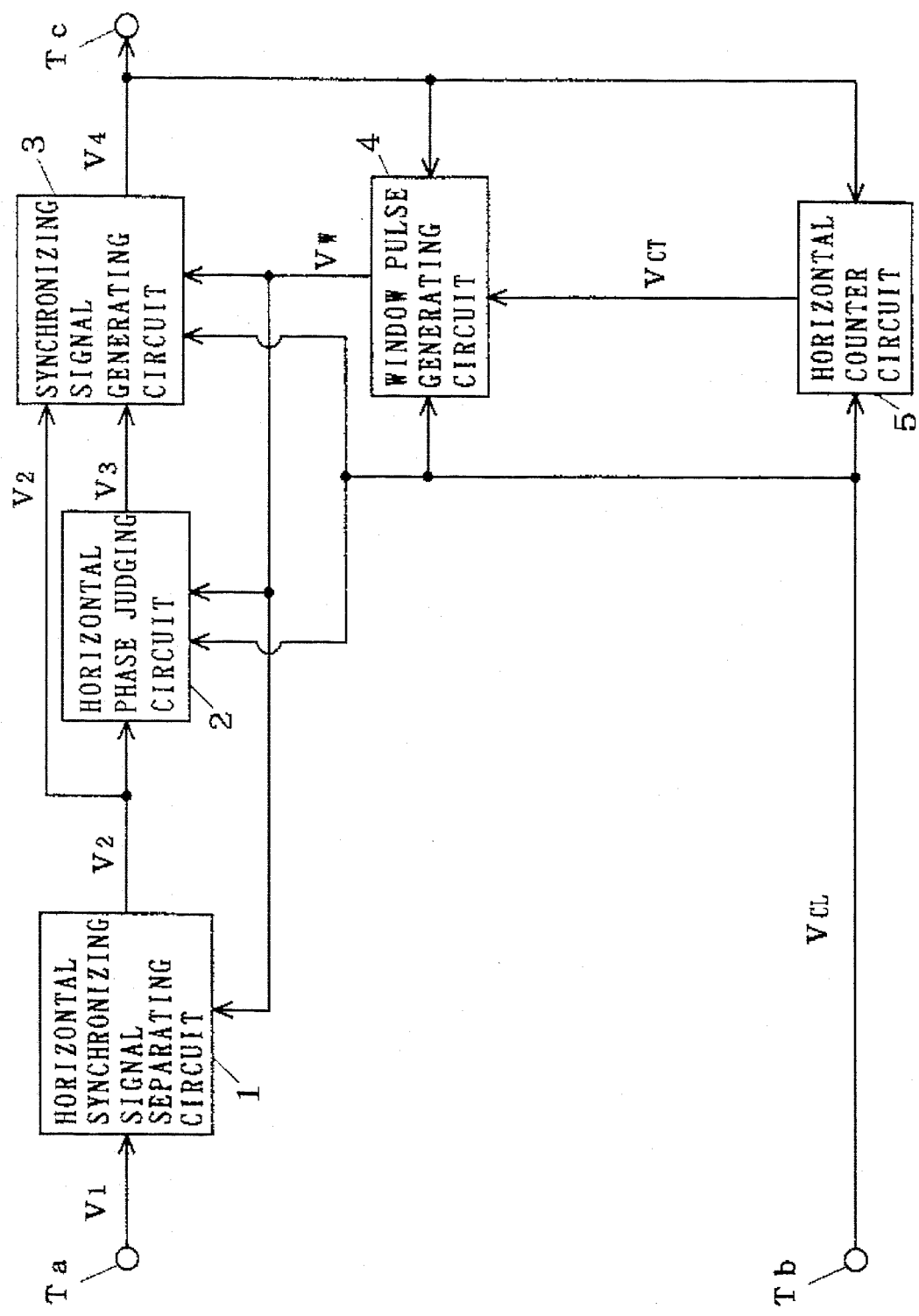
FIG. 1 is a block diagram of a horizontal synchronizing signal generating circuit according to a first preferred embodiment of the present invention.

FIG. 1 is a block diagram of a horizontal synchronizing signal generating circuit according to the first preferred embodiment. An input terminal Ta is a first input terminal receiving a composite synchronizing signal $V_1$ (also referred to as an entered composite synchronizing signal), and an input terminal Tb is a second input terminal receiving a reference clock $V_{CL}$. A horizontal synchronizing signal separating circuit 1 is connected to the input terminal Ta and a window pulse generating circuit 4 to be described later for separating a horizontal synchronizing signal $V_2$ (also referred to as a separated horizontal synchronizing signal) from the entered composite synchronizing signal $V_1$ to output the horizontal synchronizing signal $V_2$.

A horizontal phase judging circuit 2 receives the separated horizontal synchronizing signal $V_2$ from the horizontal synchronizing signal separating circuit 1, a horizontal synchronization reference reception signal $V_W$ (referred to hereinafter as a window pulse signal) from the window pulse signal generating circuit 4, and the reference clock $V_{CL}$. The horizontal phase judging circuit 2 judges whether or not the horizontal frequency of the separated horizontal synchronizing signal $V_2$ falls within an allowable range to output the result of judgement as a judgement signal $V_3$.

A synchronizing signal generating circuit 3 receives the judgement signal $V_3$ from the horizontal phase judging circuit 2, the separate horizontal synchronizing signal $V_2$ from the horizontal synchronizing signal separating circuit 1, the window pulse signal $V_W$ from the window pulse generating circuit 4, and the reference clock $V_{CL}$, for producing a horizontal synchronizing signal $V_4$. An output of the synchronizing signal generating circuit 3 is connected to an output terminal Tc (output means), the window pulse generating circuit 4, and a horizontal counter circuit 5. The frequency of the reference clock $V_{CL}$ is several times the horizontal frequency (a period of 16 ms) determined by the video synchronizing signal standards.

The horizontal counter circuit 5 counts the reference clock $V_{CL}$ entered at the input terminal Tb to output the count value as a count output $V_{CT}$.

The window pulse generating circuit 4 receives the count output $V_{CT}$ from the horizontal counter circuit 5, the horizontal synchronizing signal $V_4$, and the reference clock $V_{CL}$. The window pulse generating circuit 4 generates the window pulse signal $V_W$ in response to the signals $V_4$, $V_{CT}$, $V_{CL}$.

it should be noted that, in the first preferred embodiment, the circuits 1, 2 form a judging means, the circuits 3, 4, 5 form an internal signal generating means, and the circuits 4, 5 form a window pulse signal generating means.

Operation of the horizontal synchronizing signal generating circuit will be described hereinafter.

The composite synchronizing signal $V_1$ entered at the input terminal Ta is applied to the horizontal synchronizing signal separating circuit 1 which also receives the window pulse signal $V_W$ generated in the window pulse generating circuit 4 and adapted to be low ("L" level) over a constant time period $\Delta t_1$ (a first time period) the midpoint of which is the falling edge of a standard horizontal synchronizing signal. The standard horizontal synchronizing signal is a signal having the horizontal frequency determined by the video synchronizing signal standards and corresponds to the horizontal synchronizing signal $V_4$ to be described later. The horizontal synchronizing signal separating circuit 1 detects whether or not a falling edge of the composite synchronizing signal $V_1$ exists within the time period $\Delta t_1$ over which the window pulse signal $V_W$ is low. If it exists, the horizontal synchronizing signal separating circuit 1 determines that the entered composite synchronizing signal $V_1$ is the horizontal synchronizing signal to output the separated horizontal synchronizing signal $V_2$. If it does not exist, the horizontal synchronizing signal separating circuit 1 does not output the horizontal synchronizing signal $V_2$. Thus, the output from the horizontal synchronizing signal separating circuit 1 remains low. The horizontal synchronizing signal separating circuit 1 successively performs this operation to separate the horizontal synchronizing signal $V_2$ from the composite synchronizing signal $V_1$.

The horizontal synchronizing signal $V_2$ separated in the horizontal synchronizing signal separating circuit 1 is entered into the horizontal phase judging circuit 2. The horizontal phase judging circuit 2 determines that the horizontal synchronizing signal $V_2$ is a standard signal if the horizontal synchronizing signal $V_2$ exists within the time period $\Delta t_1$ over which the window pulse signal $V_W$ is low and determines that the horizontal synchronizing signal $V_2$ is a nonstandard signal if it does not, to set the standard/nonstandard flag signal $V_3$ indicative of the result of judgement to the synchronizing signal generating circuit 3. The nonstandard signal means that the horizontal frequency of the composite synchronizing signal $V_1$ is different from the value determined by the video synchronizing signal standards or that the composite synchronizing signal $V_1$ is absent (and is also referred to as a nonstandard horizontal synchronizing signal).

The synchronizing signal generating circuit 3 synchronizes the horizontal synchronizing signal $V_2$ from the horizontal synchronizing signal separating circuit 1 with the reference clock $V_{CL}$ (910fH and the like) from the input terminal Tb and then converts the horizontal synchronizing signal $V_2$ after the synchronization into a horizontal synchronizing signal (HD1) to be produced. Further, the synchronizing signal generating circuit 3 produces a free-running horizontal synchronizing signal (HD2) from the window pulse signal $V_W$ and the reference clock $V_{CL}$. In this case, the term "free-running" means that the signal HD2 is internally produced from the reference clock $V_{CL}$ and the window pulse signal $V_W$. The free-running horizontal synchronizing signal HD2 is also the standard horizontal synchronizing signal having the horizontal frequency determined by the video synchronizing signal standards.

The synchronizing signal generating circuit 3 selectively outputs the two horizontal synchronizing signals HD1 and HD2 in response to the judgement result of the standard/nonstandard flag signal $V_3$. Specifically, the synchronizing signal generating circuit 3 outputs the horizontal synchronizing signal HD1 as the horizontal synchronizing signal $V_4$ if the judgment is the standard signal, and the signal $V_4$ is outputted at the output terminal Tc to an external circuit system. On the other hand, if the judgement is the nonstandard signal, the synchronizing signal generating circuit 3 outputs the free-running horizontal synchronizing signal HD2 generated from the window pulse signal $V_W$ and the reference clock $V_{CL}$ as the horizontal synchronizing signal $V_4$.

The horizontal counter circuit 5 is reset by the horizontal synchronizing signal $V_4$ from the synchronizing signal generating circuit 3 to perform the counting operation in synchronism with the reference clock $V_{CL}$ entered at the input terminal Tb. The window pulse generating circuit 4, after being reset by the horizontal synchronizing signal $V_4$, compares the counter output $V_{CT}$ from the horizontal counter circuit 5 with a preset standard window pulse output timing value (set value). The window pulse generating circuit 4 then outputs the window pulse signal $V_W$ when the count output value equals the set value.

Figure 2:
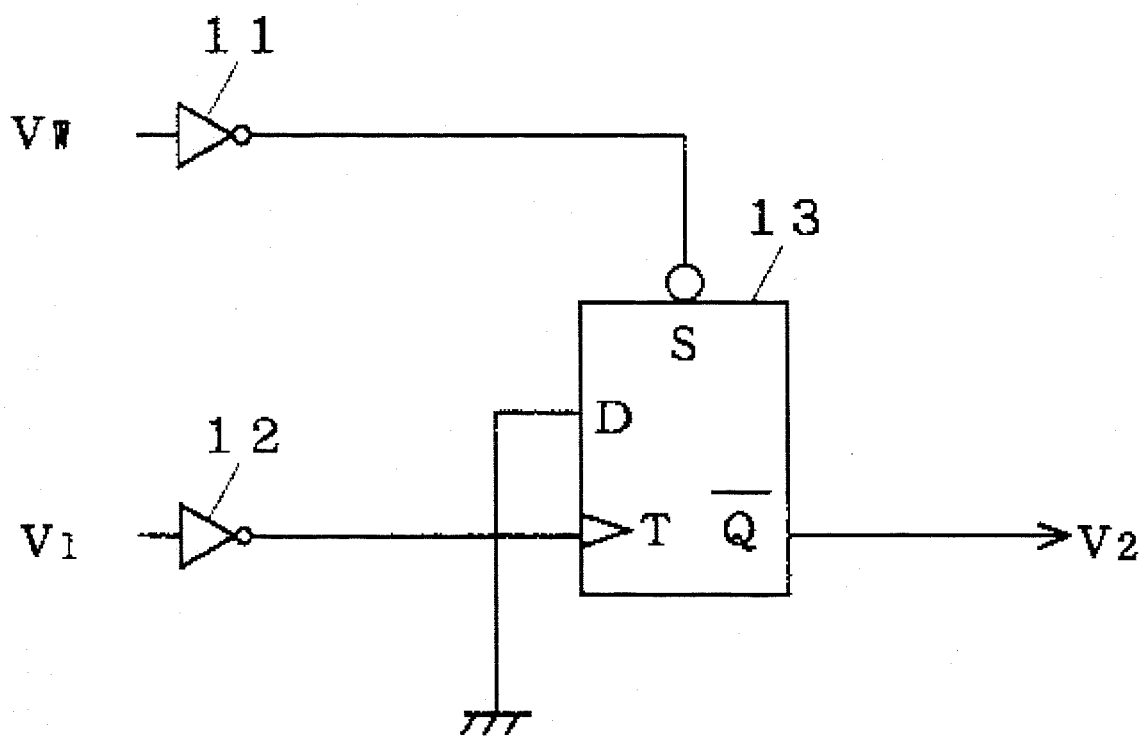
FIG. 2 is a circuit diagram of a horizontal synchronizing signal separating circuit.

FIG. 2 illustrates a detailed circuit arrangement of the horizontal synchronizing signal separating circuit 1. The horizontal synchronizing signal separating circuit 1 includes two inverter circuits 11, 12 and a D flip-flop circuit 13. The D flip-flop circuit 13 is reset at the falling edge of the window pulse signal $V_W$, and the horizontal synchronizing signal $V_2$ at the $\bar{Q}$ output of the D flip-flop circuit 13 goes low. Then, when the composite synchronizing signal $V_1$ falls, the horizontal synchronizing signal $V_2$ rises to "H". Conversely, if the composite synchronizing signal $V_1$ does not falls within the time period $\Delta t_1$ between the fall time and rise time of the window pulse signal $V_W$, the horizontal synchronizing signal $V_2$ remains low.

Figure 3:
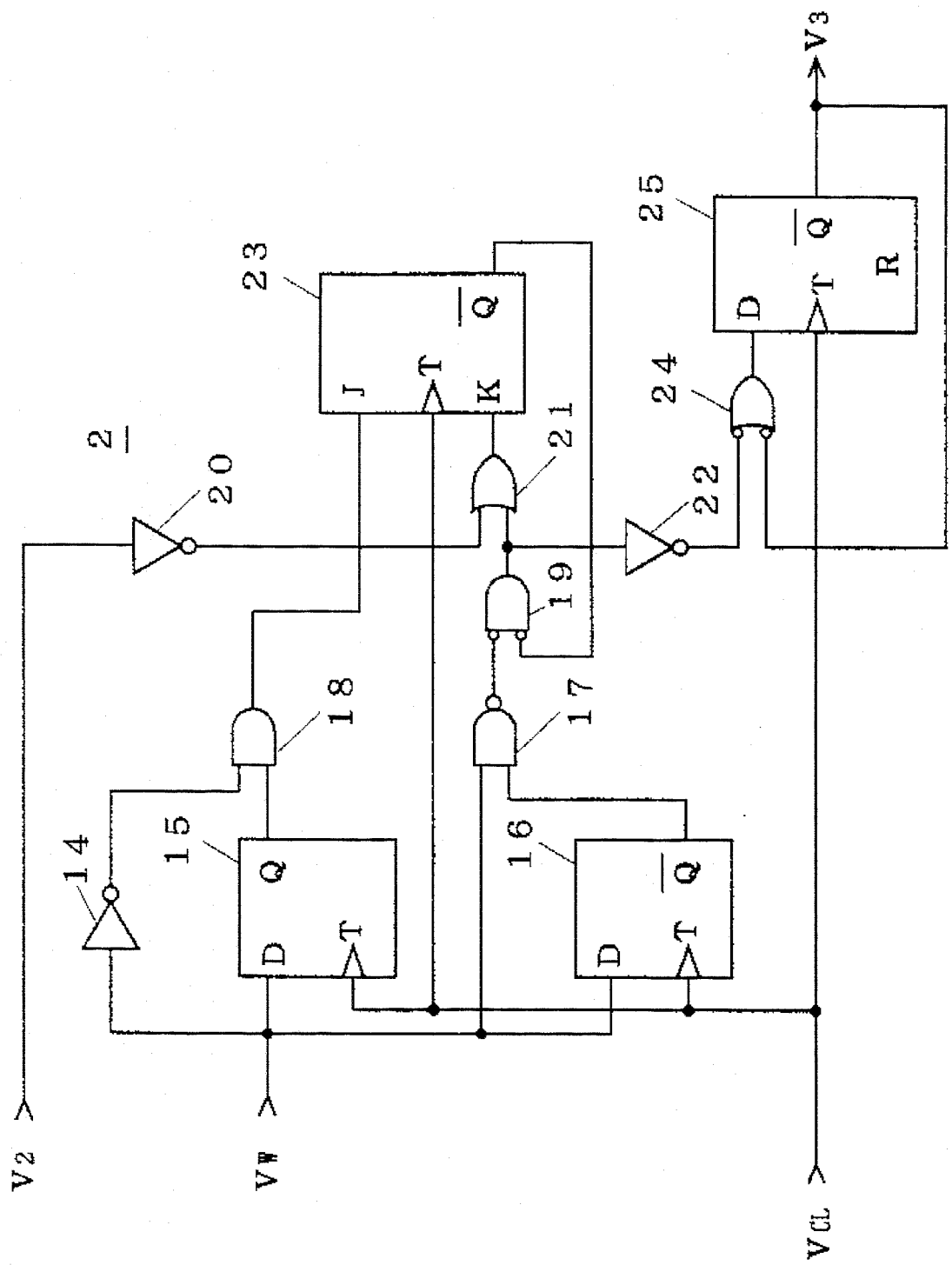
FIG. 3 is a circuit diagram of a horizontal phase judging circuit.

FIG. 3 illustrates a detailed circuit arrangement of the horizontal phase judging circuit 2. The horizontal phase judging circuit 2 includes inverter circuits 14, 20, 22, three D flip-flop circuits 15, 16, 25, a J-K flip-flop circuit 23, NAND circuits 17, 24, an AND circuit 18, an OR circuit 21, and an NOR circuit 19. The output signal $V_3$ from the horizontal phase judging circuit 2 is high (standard flag signal) if the separated horizontal synchronizing signal $V_2$ exists within the time period $\Delta t_1$, and it is low (nonstandard flag signal) if the horizontal synchronizing signal $V_2$ within the time period $\Delta t_1$ is low (the absence of the horizontal synchronizing signal $V_2$).

Figure 4:
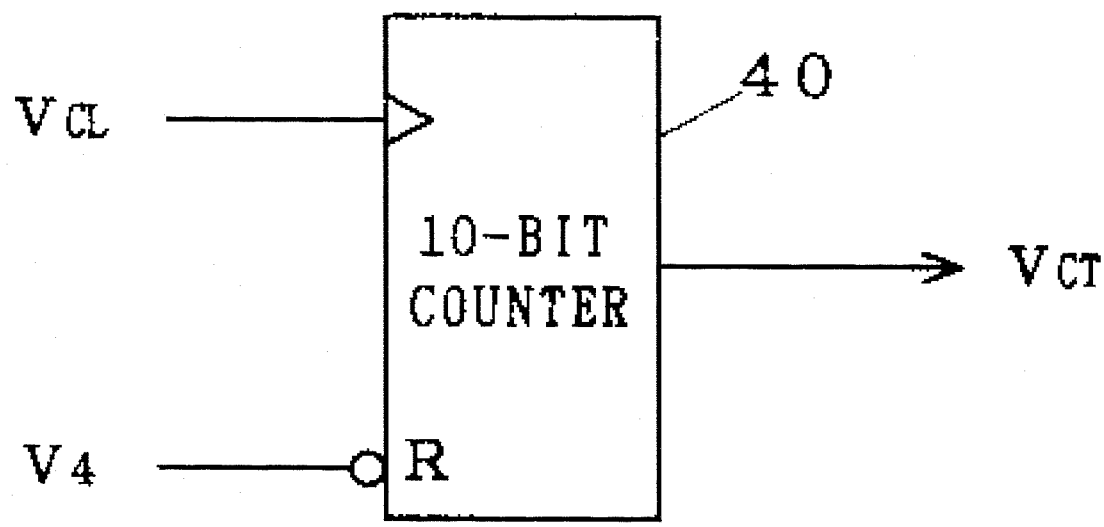
FIG. 4 is a circuit diagram of a horizontal counter circuit.

FIG. 4 illustrates a detailed circuit arrangement of the horizontal counter circuit 5. The horizontal counter circuit 5 includes a 10-bit counter 40. The 10-bit counter 40 is reset by the horizontal synchronizing signal $V_4$ (count value 0) and then counts the reference clock $V_{CL}$ to output the count value as the counter output $V_{CT}$.

Figure 5:
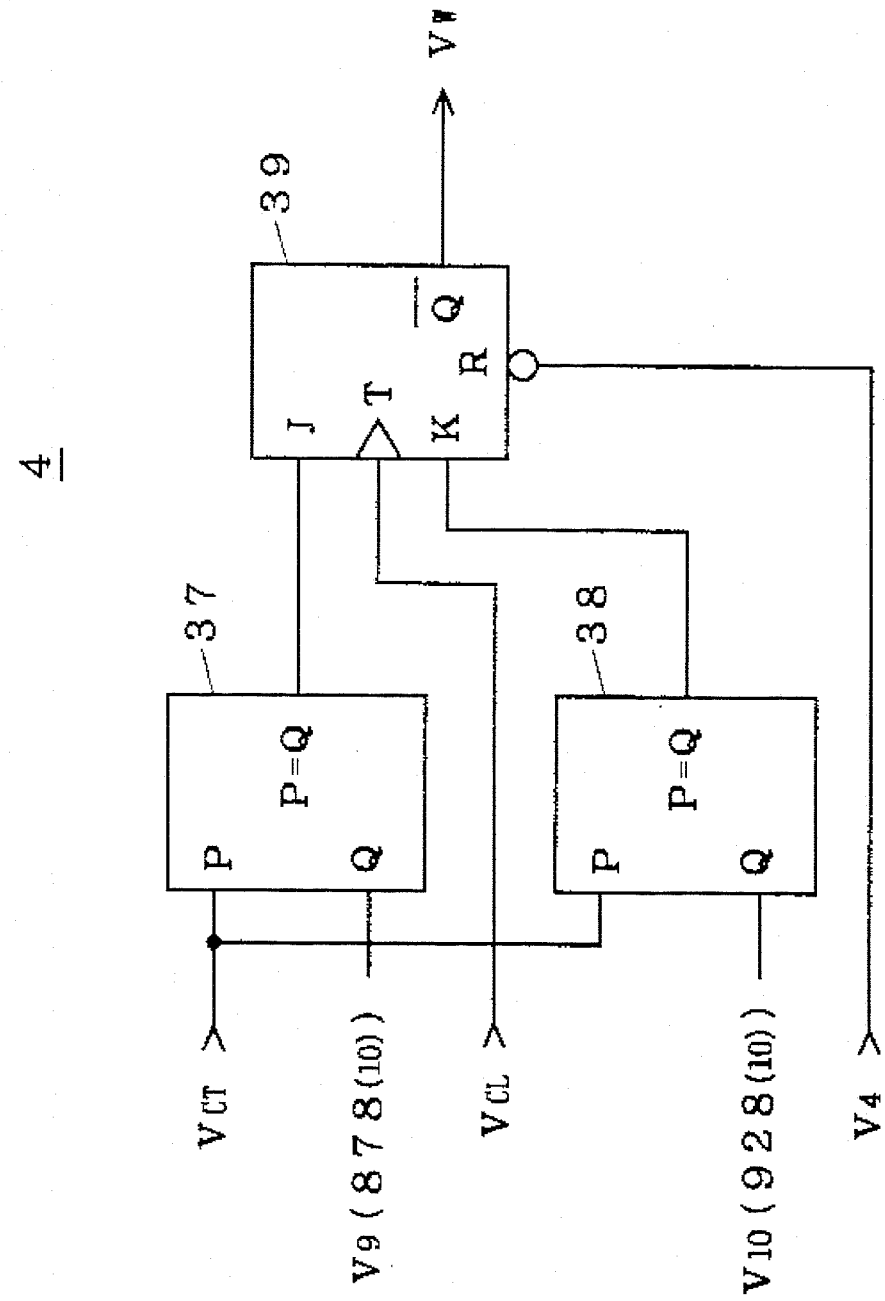
FIG. 5 is a circuit diagram of a window pulse generating circuit.

FIG. 5 illustrates a detailed circuit arrangement of the window pulse generating circuit 4. The counter output $V_{CT}$ from the counter circuit 40 set to "0" at the falling edge of the horizontal synchronizing signal $V_4$ for counting up the reference clock $V_{CL}$ in the horizontal counter circuit 5 is applied to P terminals of comparators 37, 38 of the window pulse generating circuit 4. A signal $V_9$ indicative of an output start timing value (count value $878_{(10)}$) of the window pulse signal $V_W$ is previously set at a Q terminal, a second input, of the comparator 37, and a signal $V_{10}$ indicative of an output end timing value (count value $928_{(10)}$) thereof is previously set at a Q terminal, a second input, of the comparator 38. The difference 50 between the two count values is equivalent to the time period $\Delta t_1$.

When the counter output $V_{CT}$ equals the output start timing value (878) of the window pulse signal $V_W$, the comparator 37 outputs an "H" signal which in turn sets a $\bar{Q}$ output of a J-K flip-flop circuit 39 on the next stage to "L" in synchronism with the rising edge of the reference clock $V_{CL}$. When the counter output $V_{CT}$ equals the output end timing value (928), the comparator 38 outputs an "H" signal which in turn resets the $\bar{Q}$ output of the J-K flip-flop circuit 39 on the next stage to "H" in synchronism with the rising edge of the reference clock $V_{CL}$. Through the sequence of operations, the J–K flip-flop circuit 39 outputs the window pulse signal $V_W$ which is low over the time period $\Delta t_1$.

Figure 6:
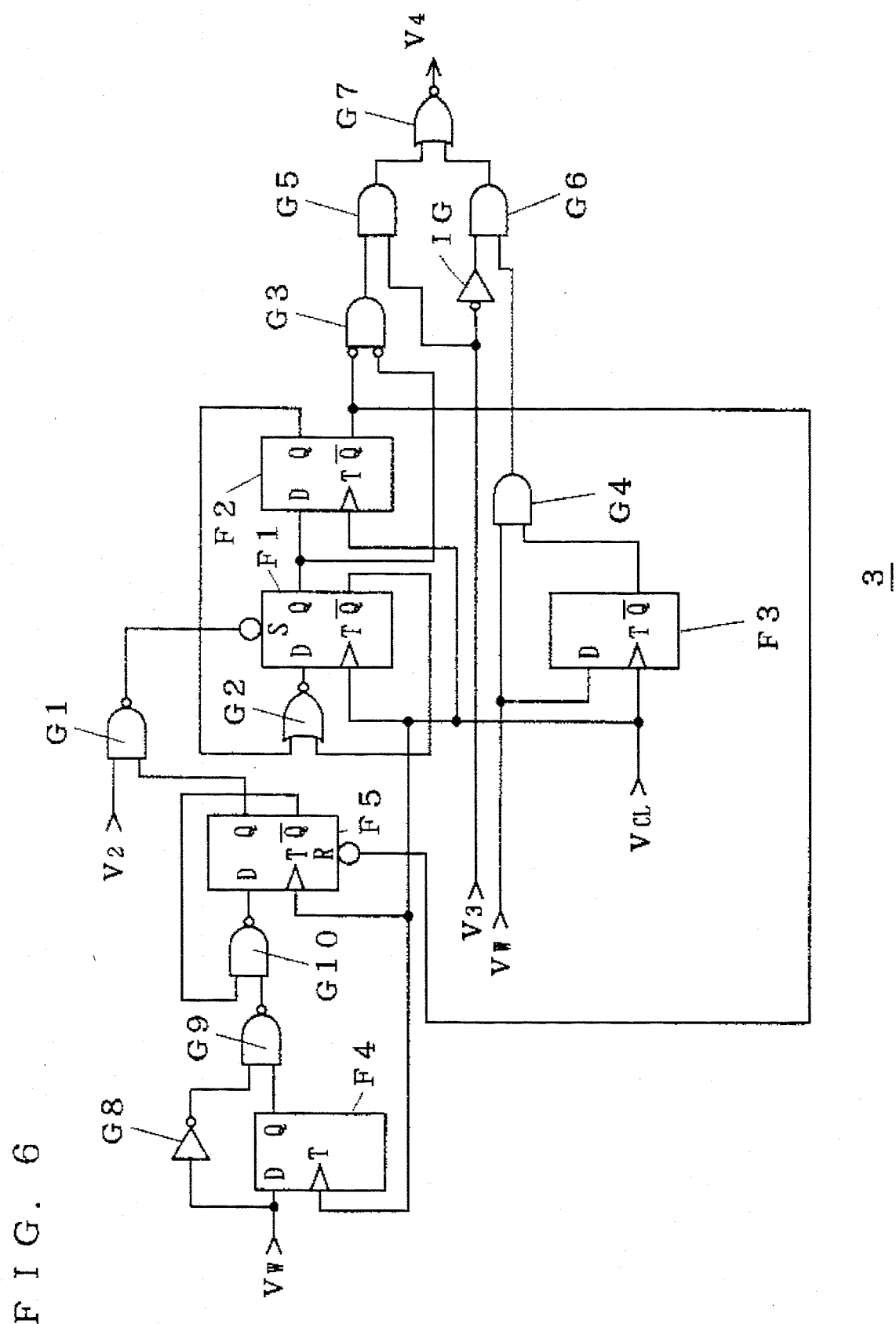
FIG. 6 is a circuit diagram of a synchronizing signal generating circuit.

FIG. 6 illustrates a detailed circuit arrangement of the synchronizing signal generating circuit 3. The window pulse signal $V_W$ generated by the window pulse generating circuit 4 is entered into a D flip-flop circuit F4 and an inverter G8, and an Q output from the D flip-flop circuit F4 and an output from the inverter circuit G8 are entered into an NAND gate G9. That is, the D flip-flop circuit F4 outputs an "L" pulse and the NAND gate G9 outputs an "H" signal at the falling edge of the window pulse signal $V_W$.

The output from the NAND gate G9 is entered into an NAND gate G10 on the next stage, and a D flip-flop circuit F5 is set to "H" by the rising edge of the reference clock $V_{CL}$. The D flip-flop circuit F5 is held high until a $\overline{Q}$ output of a D flip-flop circuit F2 goes low.

When the output signal $V_2$ from the horizontal synchronizing signal separating circuit 1 goes high after an output from the flip-flop circuit F5 is set to "H", a D flip-flop circuit F1 is set, and a Q output of a D flip-flop circuit F2 on the next stage is set to "H" by the rising edge of the reference clock $V_{CL}$. The D flip-flop circuit F1 is set to "L" at the rising edge of the reference clock $V_{CL}$ which immediately follows the rising edge by which the D flip-flop circuit F2 is set to "H". At the same time, an NOR gate G3 outputs an "H" pulse. The output from the NOR gate G3 falls to "L" at the next rising edge of the reference clock $V_{CL}$.

The window pulse signal $V_W$ is entered into a D flip-flop circuit F3 and an AND gate G4, and the AND gate G4 outputs an "H" pulse at the rising edge of the window pulse signal $V_W$.

As above described, a first horizontal synchronizing signal generating circuit portion including the components G8 to G10, G1 to G3, F1, F2, F4, and F5 of FIG. 6 produces and outputs the horizontal synchronizing signal (HD1) synchronized with the reference clock $V_{CL}$ from the separated horizontal synchronizing signal $V_2$ in response to the window pulse signal $V_W$ and the reference clock $V_{CL}$. A second horizontal synchronizing signal generating circuit portion including the components F3 and G4 internally produces and outputs the standard horizontal synchronizing signal (HD2) synchronized with the reference clock $V_{CL}$ from the window pulse signal $V_W$. Further, circuits G5 to G7 and an inverter circuit IG form a select means for selectively outputs respective signals outputted from the first and second horizontal synchronizing signal generating circuit portions in accordance with the result of the judgement signal $V_3$.

The pulse outputted from the NOR gate G3 and the pulse outputted from the AND gate G4 are selected in response to the judgement signal $V_3$ from the horizontal phase judging circuit 2. Specifically, the pulse outputted from the AND gate G5 is selected when the judgement signal $V_3$ indicates the standard signal flag (H), and the pulse outputted from the AND gate G6 is selected when the judgement signal $V_3$ indicates the nonstandard signal flag (L). The selected pulse is inverted by the NOR gate G7, and the inverted pulse is outputted as the horizontal synchronizing signal $V_4$.

Figure 7:
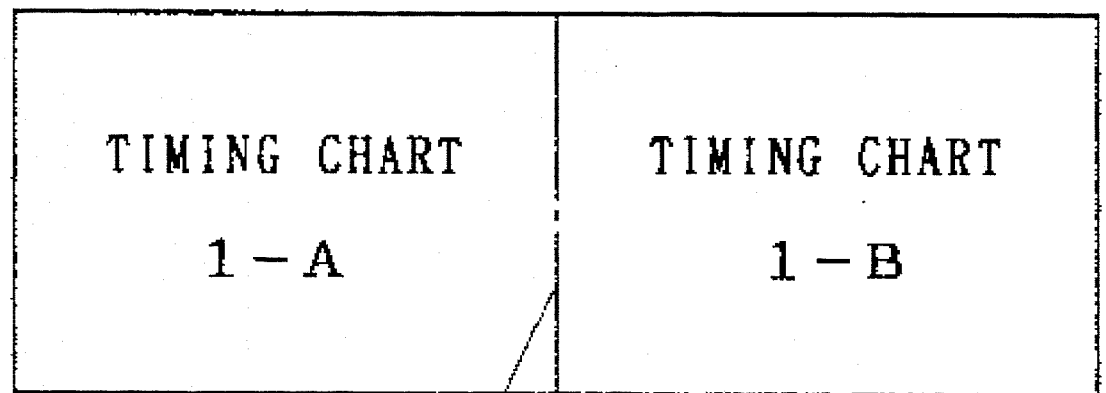
FIGS. 7, 8A–8G and 9A–9G are timing charts of the first preferred embodiment.
Figure 8:
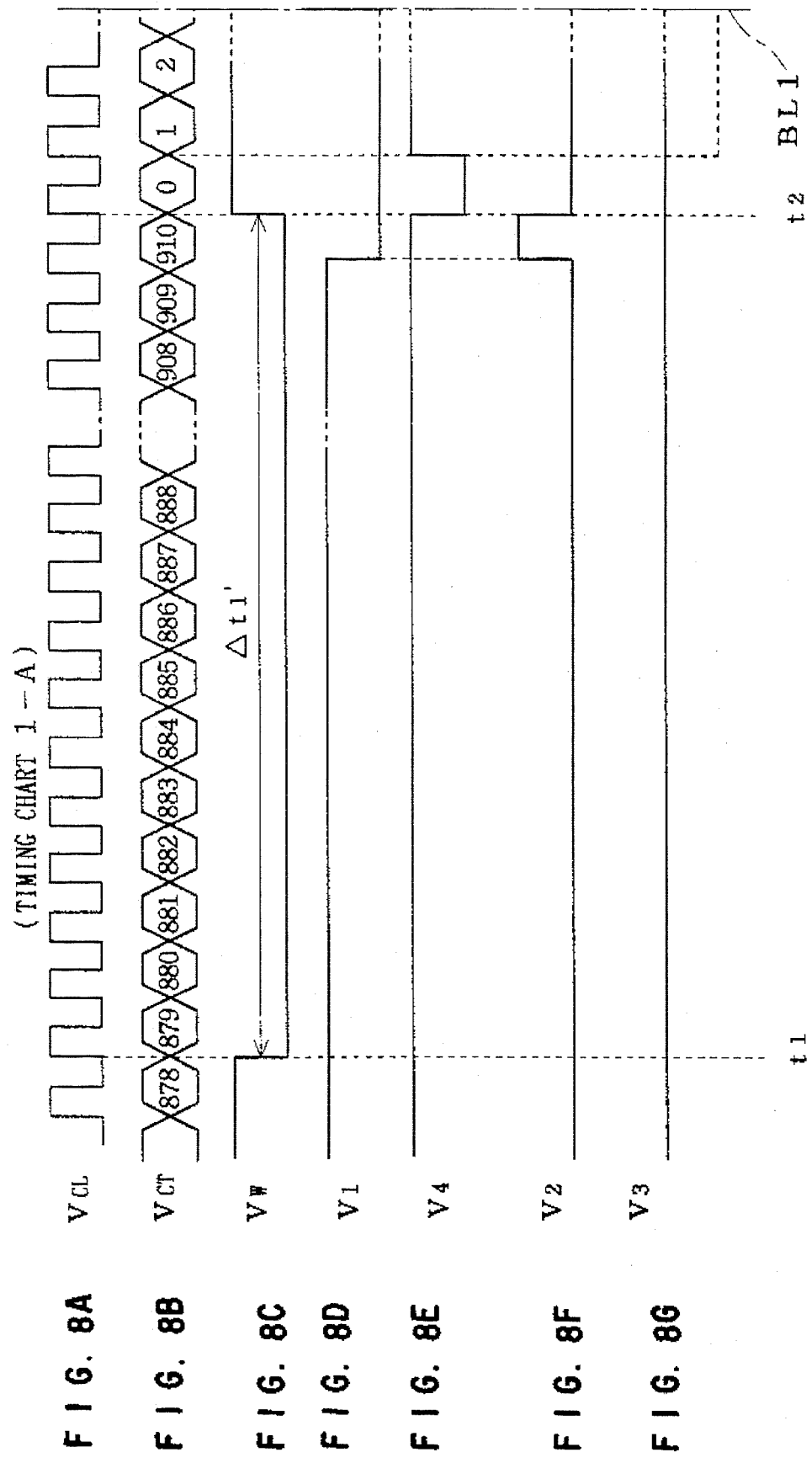
Figure 9:
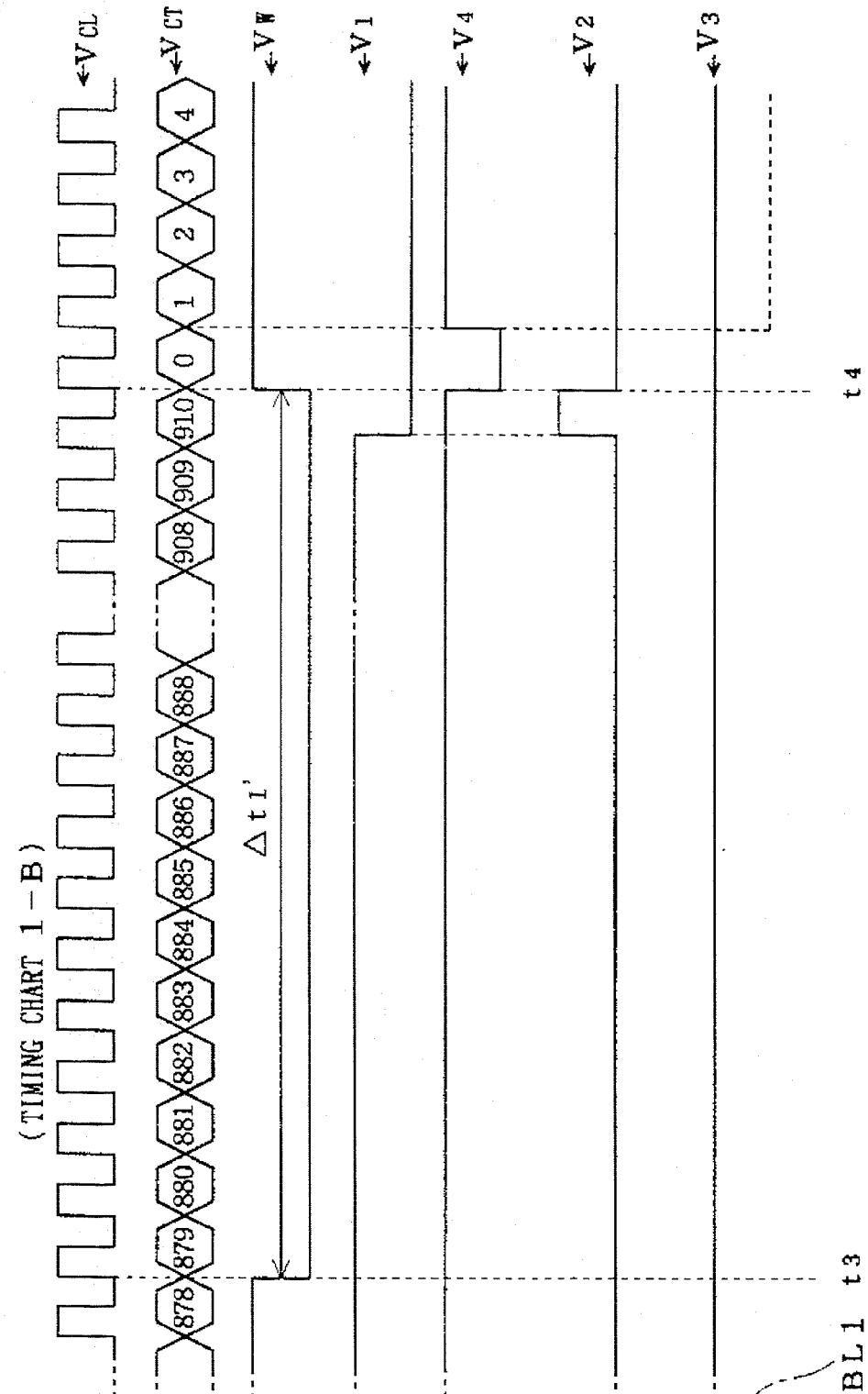

FIGS. 7, 8A–8G and 9A–9G are timing charts in the horizontal synchronizing signal generating circuit of the first preferred embodiment. FIG. 7 indicates that a timing chart is divided in two by a boundary line BL1 for purposes of illustration. FIGS. 8A–8G and 9A–9G illustrate the two divided timing charts 1-A and 1-B, respectively, where the entered composite synchronizing signal $V_1$ is the standard horizontal synchronizing signal.

Referring to FIGS. 8A–8G and 9A–9G, the window pulse signal $V_W$ falls to "L" at time $t_1$ at which the counter output $V_{CT}$ equals the count value 878 indicative of the standard window pulse output timing value. If the entered composite synchronizing signal $V_1$ is the nonstandard signal, the window pulse signal $V_W$ remains low until the time at which the counter output $V_{CT}$ equals the count value 928 (FIG. 5), as shown in timing charts 2-A and 2-B in FIGS. 15A–15K and 16A–16I to be described later. However, in this case, the entered composite synchronizing signal $V_1$ is the standard signal which falls during the counting up of the counter output $V_{CT}$ to the value 910. Thus, at time $t_2$, the horizontal synchronizing signal $V_4$ falls to "L" at the same time that the separated horizontal synchronizing signal $V_2$ makes an "H" to "L" transition. Then the J-K flip-flop circuit 39 of the window pulse generating circuit 4 (FIG. 5) and the 10-bit counter 40 of the horizontal counter circuit 5 (FIG. 4) are both reset. The result is the rising of the window pulse signal $V_W$ at time $t_2$. Therefore, a time period $\Delta t_1'$ over which the window pulse signal $V_W$ is actually low in this case is shorter than the first time period $\Delta t_1$ specified by the counter values 878 and 928.

As illustrated in FIGS. 8A–8G and 9A–9G, the signal provided by synchronizing the entered composite synchronizing signal $V_1$, and accordingly the horizontal synchronizing signal $V_2$, with the reference clock $V_{CL}$ is outputted as the horizontal synchronizing signal $V_4$ within the time period between $t_2$ and $t_4$. The horizontal frequency of the horizontal synchronizing signal $V_4$ conforms to the video synchronizing signal standards, and the horizontal synchronizing signal $V_4$ is in phase with the entered composite synchronizing signal $V_1$. Since the entered composite synchronizing signal $V_1$ falls during the "L" time period $\Delta t_1'$ between $t_3$ and $t_4$, the signal provided by synchronizing the entered composite synchronizing signal $V_1$ with the reference clock $V_{CL}$ is outputted as the horizontal synchronizing signal $V_4$ after time $t_4$.

On the other hand, when the entered composite synchronizing signal $V_1$ is the nonstandard signal as shown in FIGS. 15A–15K and 16A–16I, the window pulse signal $V_W$ rises to "H" at the time when the counter output $V_{CT}$ becomes 928, and the horizontal synchronizing signal $V_4$ rises to "H" at the rising edge of the reference clock $V_{CL}$ which immediately follows the rising edge of the window pulse signal $V_W$. That is, after the time at which the counter output becomes 928, the horizontal synchronizing signal $V_4$ to be outputted is the signal (HD2) generated in synchronism with both of the rising edges of the reference clock $V_{CL}$ and the window pulse signal $V_W$ in the synchronizing signal generating circuit 3. Therefore, the horizontal synchronizing signal $V_4$ has a horizontal frequency conforming to the video synchronizing signal standards and is in phase with the entered composite synchronizing signal $V_1$.

In this manner, the first preferred embodiment is adapted such that the separate processes of producing the horizontal synchronizing signal $V_4$ are used depending upon whether the entered composite synchronizing signal $V_1$ is the standard signal or the nonstandard signal. This prevents the absence of the horizontal synchronizing signal which occurs when the nonstandard signal is entered and suppresses variations in horizontal frequency. Consequently, the number of scanning lines in a field or frame conforms to the specifications. In this fashion, the first preferred embodiment has the effects of providing the horizontal synchronizing signal having the horizontal frequency of the video synchronizing signal standards and of stabilizing the horizontal synchronizing signal. The first preferred embodiment is advantageous in that the horizontal synchronizing signal in phase with the entered composite synchronizing signal is constantly provided, whether the entered composite synchronizing signal may be detected as the standard signal or the nonstandard signal.

Second Preferred Embodiment

Figure 10:
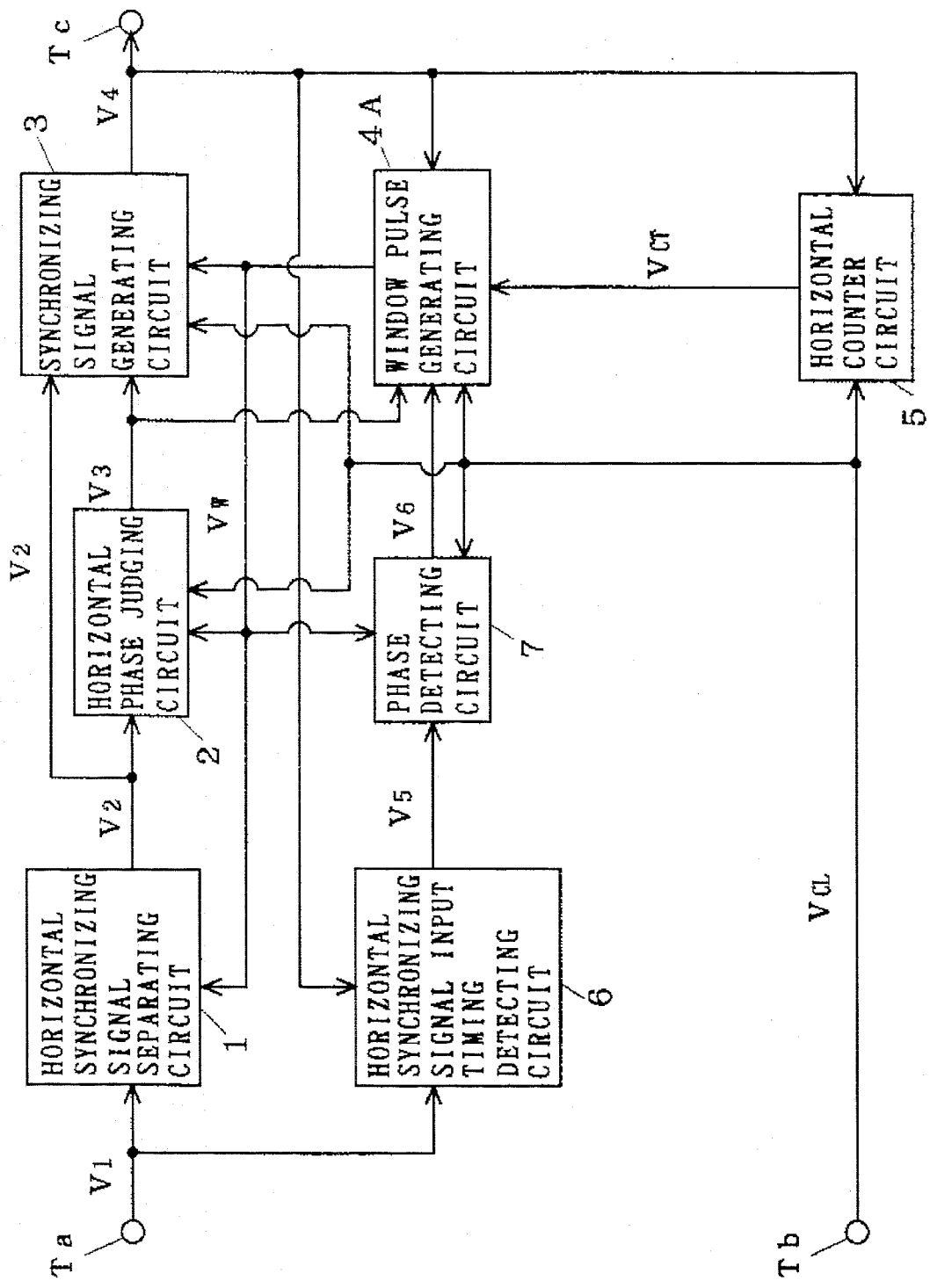
FIG. 10 is a block diagram of the horizontal synchronizing signal generating circuit according to a second preferred embodiment of the present invention.

FIG. 10 is a block diagram of the horizontal synchronizing signal generating circuit according to the second preferred embodiment of the present invention. The horizontal synchronizing signal generating circuit of the second preferred embodiment comprises a horizontal synchronizing signal input timing detecting circuit 6 and a phase detecting circuit 7 in addition to the circuit arrangement of the first preferred embodiment. A window pulse generating circuit 4A accordingly has more functions than the circuit 4 of the first preferred embodiment.

It should be noted that the circuits 6 and 7 of FIG. 10 form a phase difference detecting means or a first correction signal generating means.

The horizontal synchronizing signal input timing detecting circuit 6 is connected to the input terminal Ta, the output terminal Tc, and the phase detecting circuit 7, and includes an internal register subjected to an initial reset by the horizontal synchronizing signal $V_4$ from the synchronizing signal generating circuit 3. Then the circuit 6 receives the composite synchronizing signal $V_1$ from the input terminal Ta and detects the falling edge of the composite synchronizing signal $V_1$ to thereby judge that the signal $V_1$ corresponds to the horizontal synchronizing signal. In this manner, the circuit 6 judges that the entered composite synchronizing signal $V_1$ is the horizontal synchronizing signal by detecting the falling edge of the composite synchronizing signal $V_1$, whether the composite synchronizing signal $V_1$ may be the standard signal or the nonstandard signal. The circuit 6 sets the internal register to output a horizontal synchronization flag signal $V_5$.

The phase detecting circuit 7 is connected to the horizontal synchronizing signal input timing detecting circuit 6, the window pulse generating circuit 4A, and the input terminal Tb. The circuit 7 compares the phase of the entered horizontal synchronization flag signal $V_5$ and the phase of the window pulse signal $V_W$ to output a phase difference judgement signal $V_6$ (a first correction signal). The phase difference judgment signal $V_6$ indicates the sign (plus or minus) of the phase difference between the signals $V_5$ and $V_W$. The circuits 6 and 7 are generally referred to as the first correction signal generating means.

The window pulse generating circuit 4A receives the phase difference judgement signal $V_6$ to correct the output start timing of the window pulse signal $V_W$. Specifically, when the standard/nonstandard flag signal $V_3$ indicates the nonstandard signal flag, a preset window pulse output timing correction value $\Delta t_2$ (a second time period) is added to or subtracted from a standard window pulse output timing value for flexible variation in output timing of the window pulse signal $V_W$. Thus the output start timing of the window pulse signal $V_W$ equals the standard window pulse output timing plus or minus $\Delta t_2$ where $\Delta t_2$ is constant. The standard window pulse output liming value is the output timing value of the window pulse signal in the first preferred embodiment and is equivalent to the count value 878. Whether the second time period $\Delta t_2$ is added or subtracted is determined by the sign of the phase difference indicated by the phase difference judgement signal $V_6$. That is, the subtraction is performed ($-\Delta t_2$) when the phase difference is negative, or when the composite synchronizing signal $V_1$ leads the window pulse signal $V_W$. The addition is performed ($+\Delta t_2$) when the composite synchronizing signal $V_1$ lags behind the window pulse signal $V_W$.

Such correction is advantageous when the composite synchronizing signal $V_1$ changes from the nonstandard signal to the standard signal. When this change occurs, the window pulse signal $V_W$ itself is synchronized with the composite synchronizing signal $V_1$ which has not changed but remains in a nonstandard signal state, and a need accordingly arises to cause the window pulse signal $V_W$ to follow the composite synchronizing signal $V_1$ changed into a standard signal state. The correction using the second time period $\Delta t_2$ is made to meet this requirement.

Figure 11:
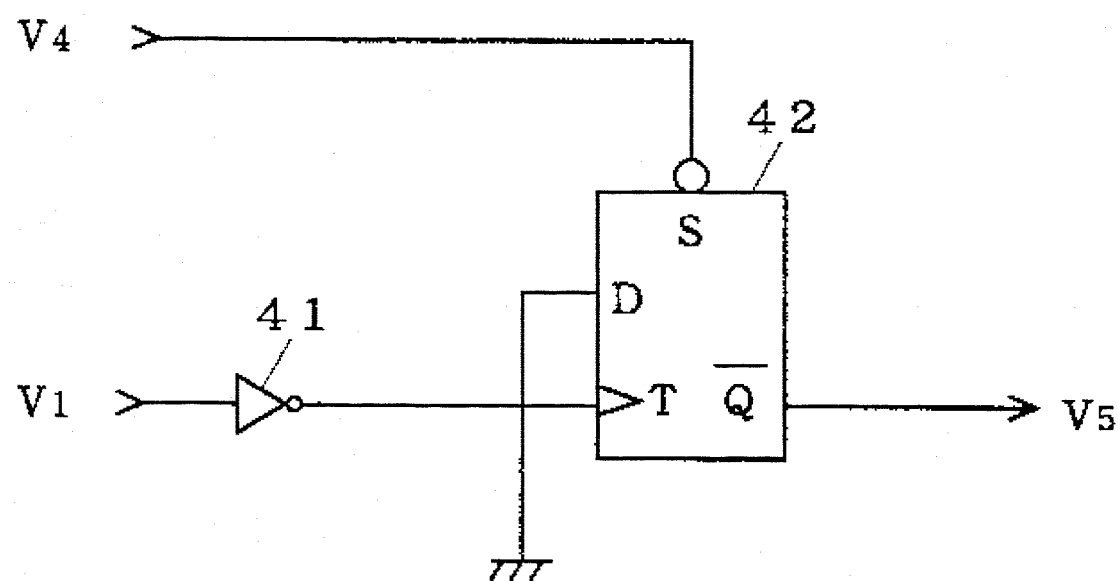
FIG. 11 is a circuit diagram of a horizontal synchronizing signal input timing detecting circuit.

FIG. 11 illustrates a detailed arrangement of the horizontal synchronizing signal input timing detecting circuit 6. The circuit 6 includes an inverter circuit 41 and a D flip-flop circuit 42. The D flip-flop circuit 42 is set (a low $\overline{Q}$ output) in response to the falling edge of the horizontal synchronizing signal $V_4$. Then the horizontal synchronization flag signal $V_5$ rises to "H" in synchronism with the falling edge of the entered composite synchronizing signal $V_1$.

Figure 12:
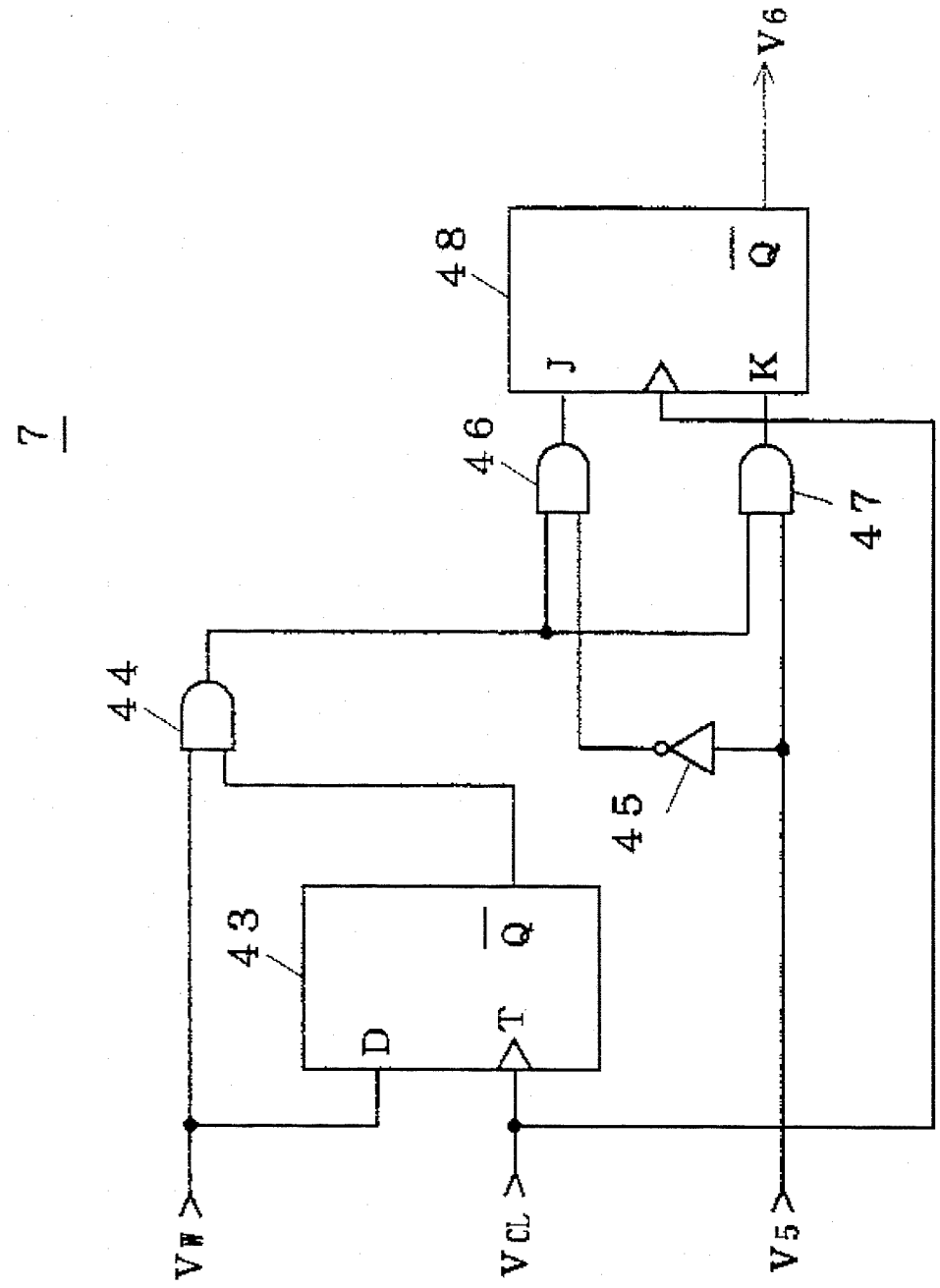
FIG. 12 is a circuit diagram of a phase detecting circuit.

FIG. 12 illustrates a detailed arrangement of the phase detecting circuit 7. The circuit 7 includes a D flip-flop circuit 43, a J–K flip-flop circuit 48, AND circuits 44, 46, 47, and an inverter circuit 45. The "L" of the phase difference judgement signal $V_6$ outputted from a $\overline{Q}$ output of the J–K flip-flop circuit 48 indicates that the falling edge of the entered composite synchronizing signal $V_1$ lags behind the rising edge of the window pulse signal $V_W$. Conversely, the "H" of the signal $V_6$ indicates that the falling edge of the signal $V_1$ leads the rising edge of the signal $V_W$.

Figure 13:
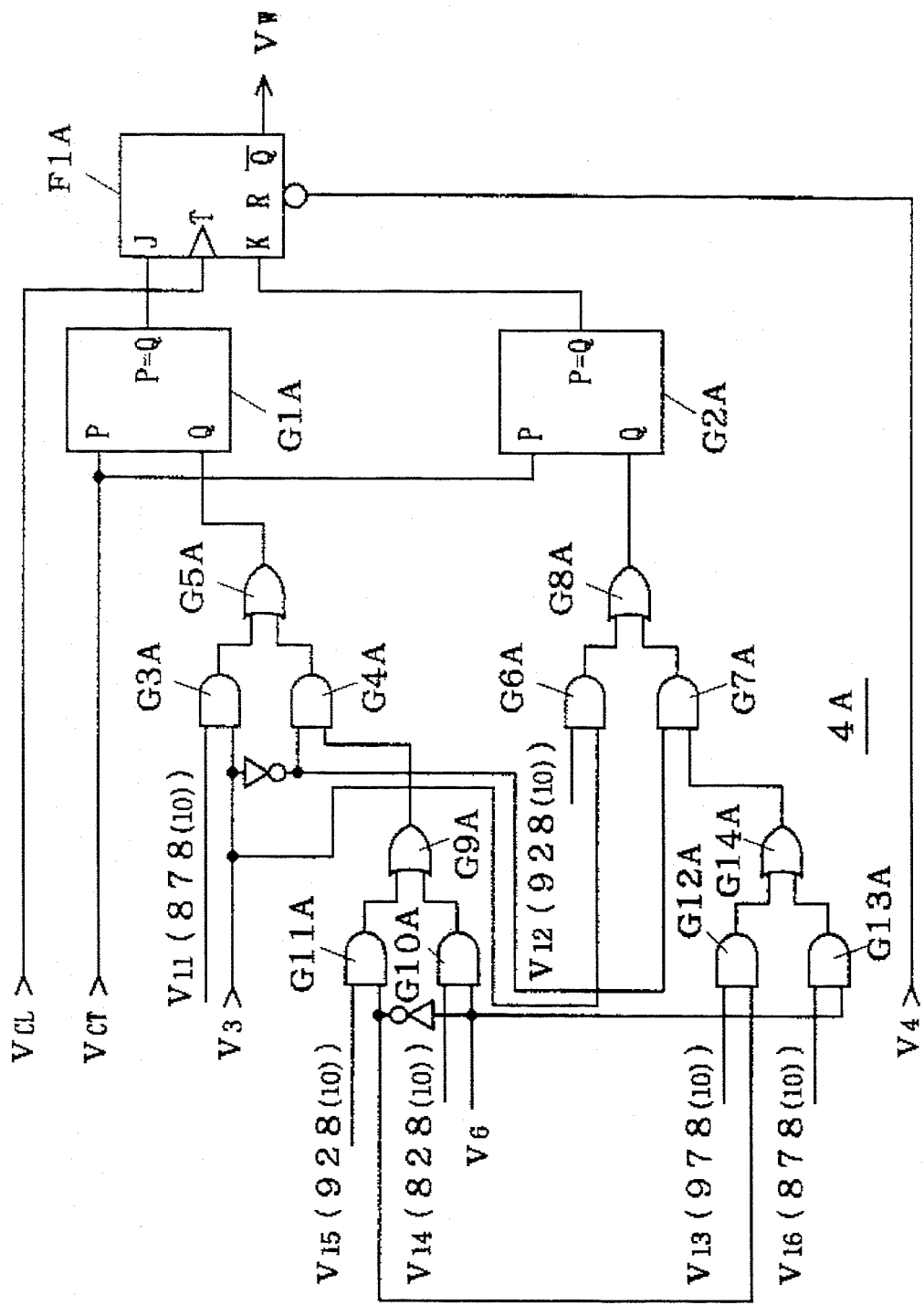
FIG. 13 is a circuit diagram of a window pulse generating circuit of the second preferred embodiment.

FIG. 13 illustrates a detailed arrangement of the window pulse generating circuit 4A.

Like the window pulse generating circuit 4, the window pulse generating circuit 4A receives the counter output $V_{CT}$ at P terminals of comparators G1A, G2A which in turn receive OR outputs from OR circuits G5A, G8A at their Q terminals, respectively.

When the judgement result of the judgment signal $V_3$ from the horizontal phase judging circuit 2 indicates the standard signal flag (H), output signals from AND gates G3A, G6A which are standard values are selected and outputted from the OR circuits G5A, G8A, respectively. The subsequent operation of the window pulse generating circuit 4A is similar to that of the window pulse generating circuit 4, and the window pulse signal $V_W$ is outputted.

When the judgement signal $V_3$ from the horizontal phase judging circuit 2 indicates the nonstandard signal flag (L), the window pulse generating circuit 4A operates in a manner to be described below. If the signal $V_6$ indicative of the phase detection result detects the entry of the entered campsite synchronizing signal $V_1$ leading a reference timing (the rising edge of the window pulse signal $V_W$), the outputted phase difference judgement signal $V_6$ is high, and outputs $V_{14}$ ($828_{(10)}$), $V_{16}$ ($878_{(10)}$) from AND gates G10A, G13A are selected which lead the standard timing by $\Delta t_2$. The phase judgement result $V_3$ causes the outputs from the AND gates G10A, G13A to be applied, as outputs from AND gates G4A, G7A, to the Q terminals of the comparators G1A, G2A respectively.

On the other hand, if the entry of the entered composite synchronizing signal $V_1$ lags behind the reference timing, the outputted signal $V_6$ is low, and output signals from AND circuits G11A, G12A which lag by $\Delta t_2$ are applied to the Q terminals of the comparators G1A, G2A, respectively. The subsequent operation of the window pulse generating circuit 4A is similar to that of the window pulse generating circuit 4, and the window pulse signal $V_W$ is outputted.

Figure 14:
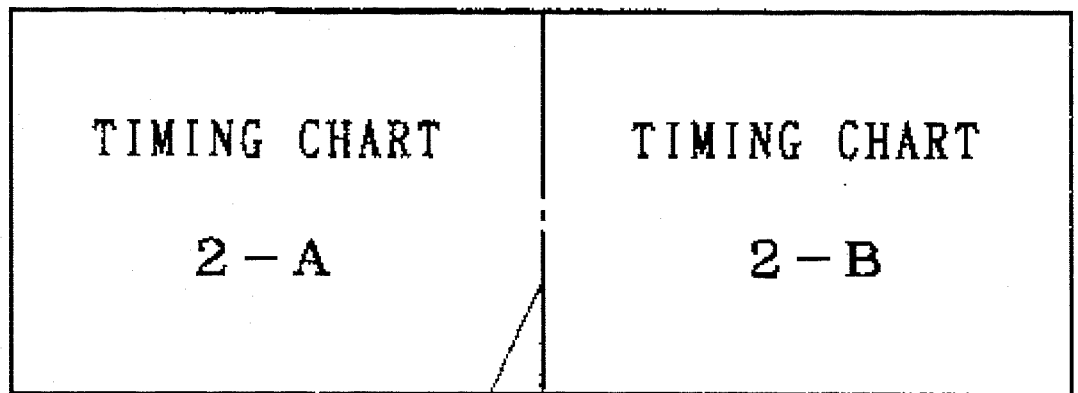
FIGS. 14, 15A–15K and 16A–16I are timing charts of the second preferred embodiment.
Figure 15:
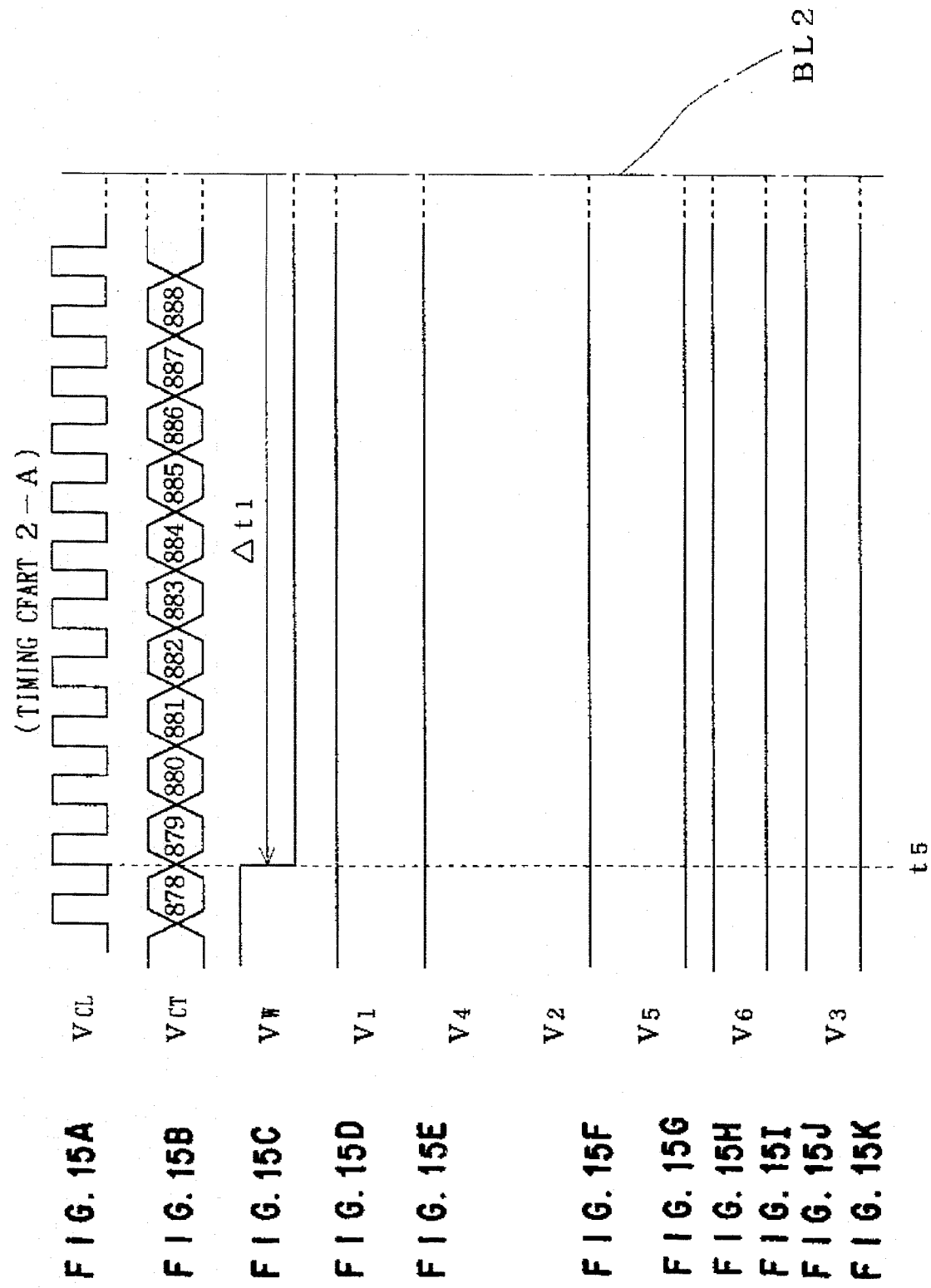
Figure 16:
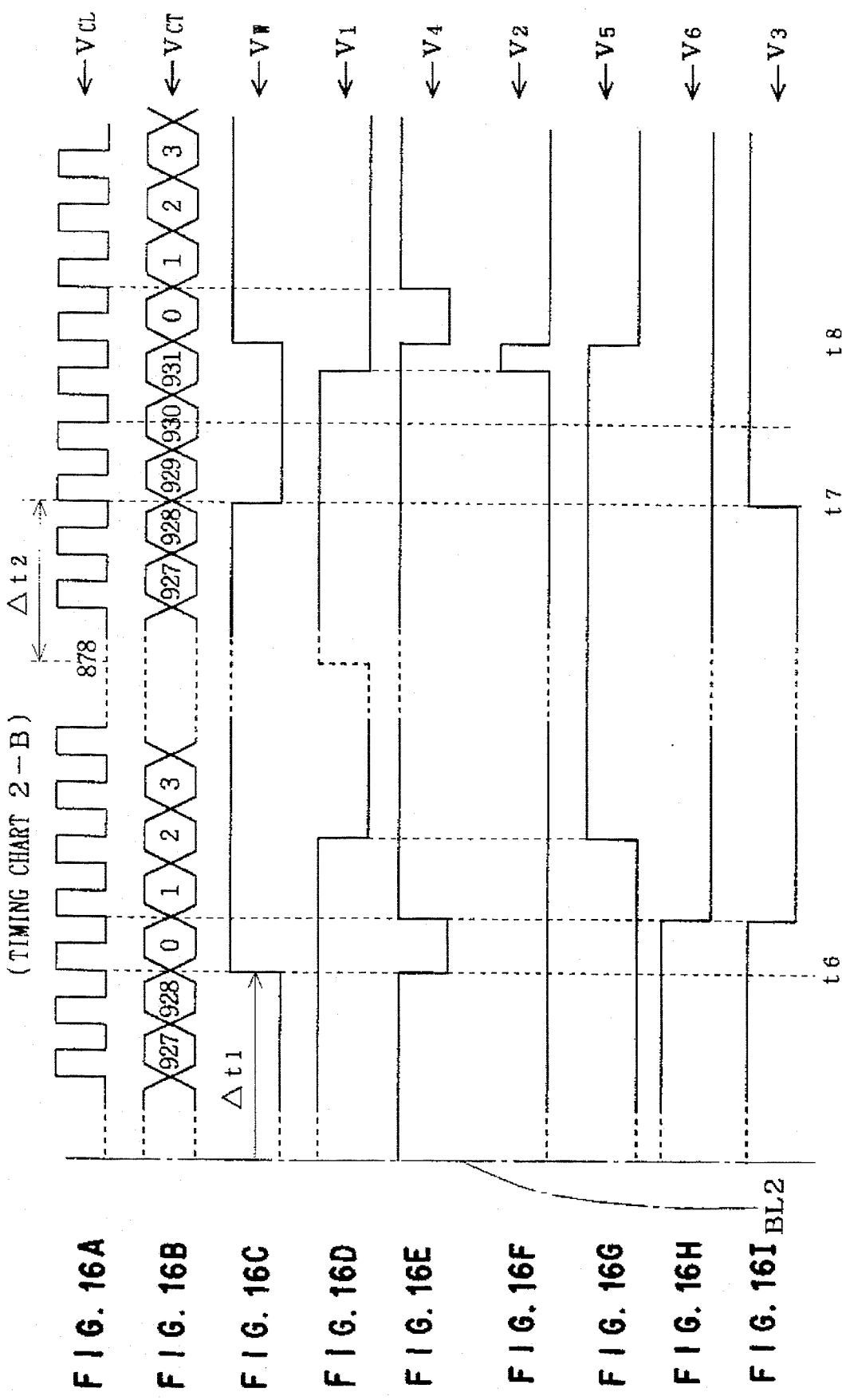

FIGS. 14, 15A–15K and 16A–16I are timing charts in second preferred embodiment. FIG. 14 indicates that a timing chart is divided into two timing charts 2-A and 2-B for purposes of illustration.

Referring to FIGS. 15A–15K and 16A–16I, the entered composite synchronizing signal $V_1$ is the nonstandard signal. Thus there is no falling edges of the signal $V_1$ within the first time period $\Delta t_1$ between times $t_5$ and $t_6$. After the time when the counter output $V_{CT}$ becomes 928 and the window pulse signal $V_W$ rises, the horizontal synchronizing signal $V_4$ (HD2) is outputted which is generated in synchronism with the signals $V_{CL}$ and $V_W$ in the synchronizing signal generating circuit 3.

In this case, since the phase difference judgement signal $V_6$ is low, the second time period $\Delta t_2$ is added to the standard window pulse output timing value (the count value 878) in the window pulse generating circuit 4A. In this preferred embodiment, the second time period $\Delta t_2$ is converted to the count value 50. Consequently, the window pulse signal $V_W$ falls to "L" at time $t_7$ at which the counter output $V_{CT}$ provides the count value 928. That is, the output start timing of the signal $V_W$ lags by the second time period $\Delta t_2$ which is equivalent to the count value 50 behind the time at which the count value 878 is provided.

The correction by the second time period $\Delta t_2$ allows the entered composite synchronizing signal $V_1$ to be detected as the standard signal and also allows the horizontal synchronizing signal $V_2$ to be separated from the entered composite synchronizing signal $V_1$. Specifically, the composite synchronizing signal $V_1$ falls within the "L" time period $\Delta t_1$ (the first time period) after time $t_7$, resulting in an "H" to "L" transition of the signal $V_2$ at time $t_8$. This causes the horizontal counter circuit 5 to be reset at the count value 931 and causes the window pulse signal $V_W$ to rise to "H". After time $t_8$, the above described horizontal synchronizing signal HD1 is outputted as the horizontal synchronizing signal $V_4$.

In this manner, the second preferred embodiment includes the circuits 6 and 7 (the phase difference detecting means) added to the circuit arrangement of the first preferred embodiment. This provides an improvement in such properties that the horizontal synchronizing signal $V_4$ to be generated follows the entered composite synchronizing signal $V_1$ over the first preferred embodiment when the entered composite synchronizing signal $V_1$ changes from the nonstandard signal to the standard signal.

Third Preferred Embodiment

Figure 17:
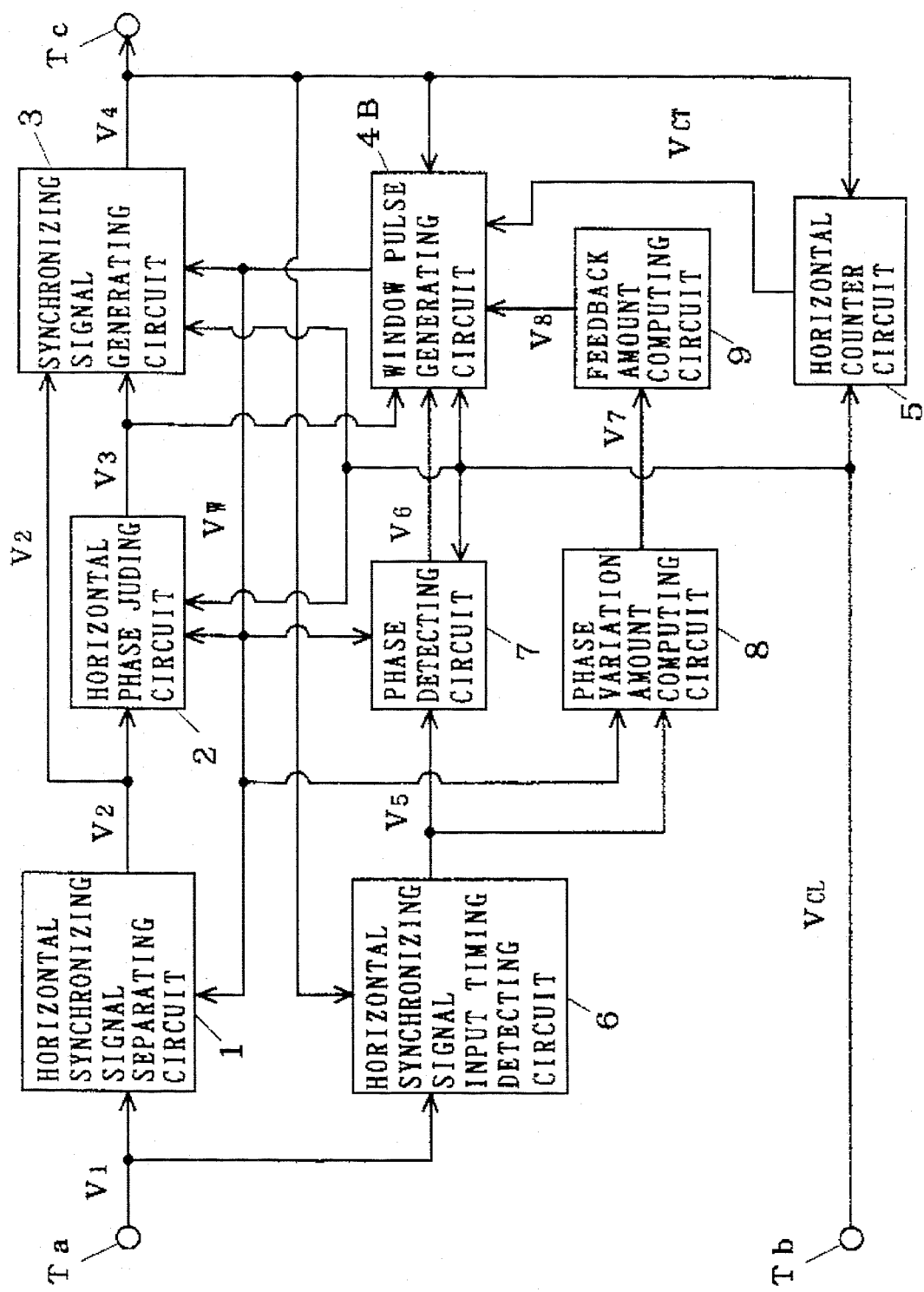
FIG. 17 is a block diagram of the horizontal synchronizing signal generating circuit according to a third preferred embodiment of the present invention.

FIG. 17 is a block diagram of the horizontal synchronizing signal generating circuit of the third preferred embodiment. The horizontal synchronizing signal generating circuit of the third preferred embodiment comprises a phase variation amount computing circuit 8 and a feedback amount computing circuit 9 in addition to the circuit arrangement of the second preferred embodiment. A window pulse generating circuit 4B accordingly has more functions than the window pulse generating circuit 4A of the second preferred embodiment.

It should be noted that the circuits 8 and 9 of FIG. 17 form a window pulse output timing correcting means or a second correction signal generating means.

The phase variation amount computing circuit 8 computes the amount of phase difference between the horizontal synchronization flag signal $V_5$ from the horizontal synchronizing signal input timing detecting circuit 6 and the window pulse signal $V_W$ to output its computed result as a phase variation amount $V_7$. The feedback amount computing circuit 9 computes the amount of window pulse output timing correction on the basis of the entered phase variation amount $V_7$ to thereby output a feedback amount $V_8$ (a second correction signal) indicative of a window pulse correction amount ($\Delta t_3$).

When the standard/nonstandard flag signal $V_3$ indicates the nonstandard signal flag, the window pulse correction amount $\Delta t_3$ outputted from the feedback amount computing circuit 9 is added to or subtracted from the standard window pulse output timing value by the window pulse generating circuit 4B for flexible variation in window pulse output timing.

Figure 18:
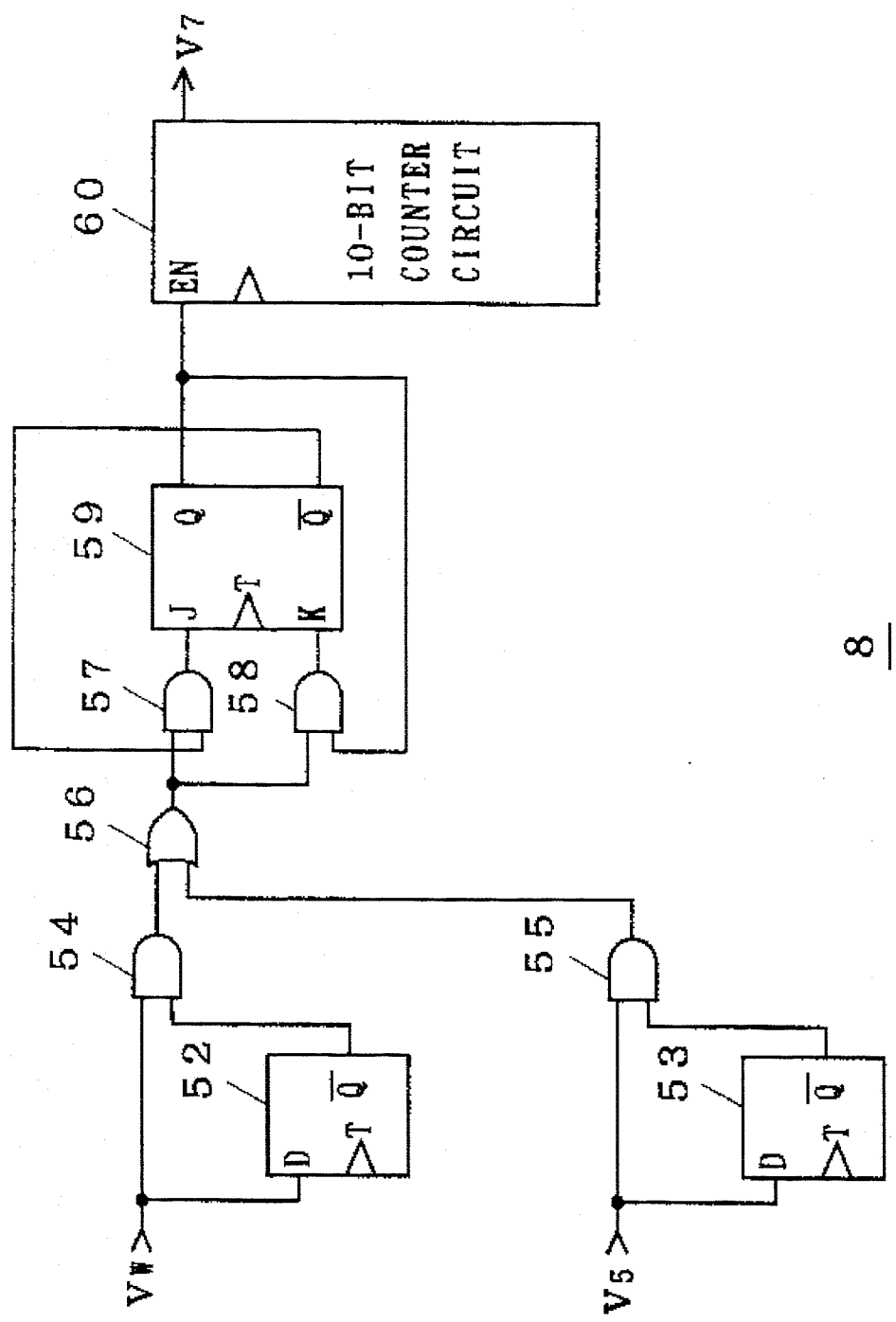
FIG. 18 is a circuit diagram of a phase variation amount computing circuit.

FIG. 18 illustrates a detailed arrangement of the phase variation amount computing circuit 8. The circuit 8 includes D flip-flops circuits 52, 53, a J–K flip-flop circuit 59, AND circuits 54, 55, 57, 58, an OR circuit 56, and a 10-bit counter circuit 60.

Figure 19:
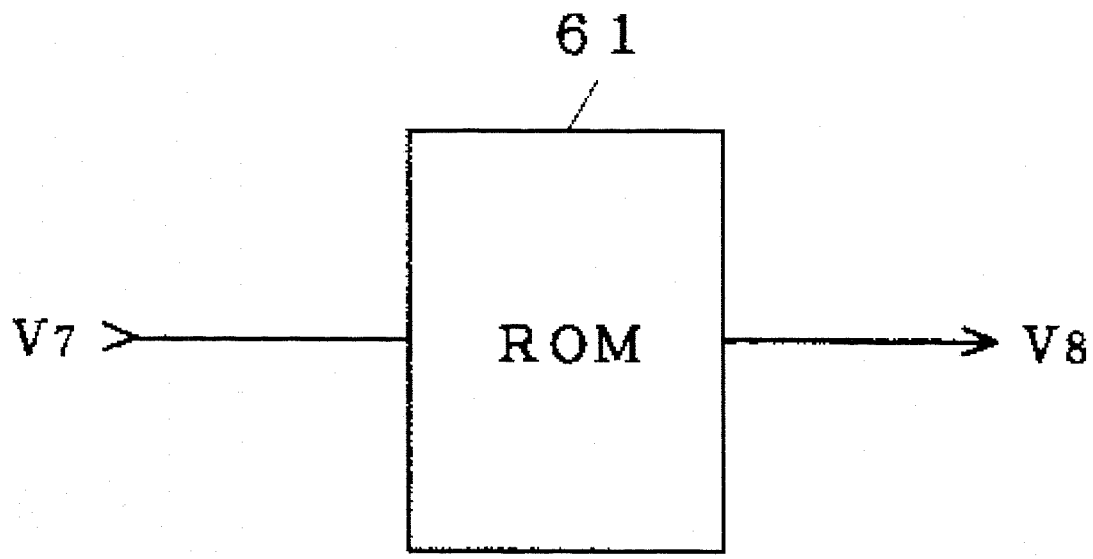
FIG. 19 is a circuit diagram of a feedback amount computing circuit.

FIG. 19 illustrates a detailed arrangement of the feedback amount computing circuit 9. The circuit 9 includes a ROM 61. The ROM 61 stores the correction values (the third time period) $\Delta t_3$ previously determined in accordance with the equation: $\Delta t_3 = k \times (\text{variation amount})$ for respective values of the counter output $V_7$ (variation amount) of the 10-bit counter circuit 60 where k is a constant satisfying $0 \leq k \leq 1$. The value $\Delta t_3$ read from the ROM 61 in response to the counter output $V_7$ is outputted as the second correction signal $V_8$.

Figure 20:
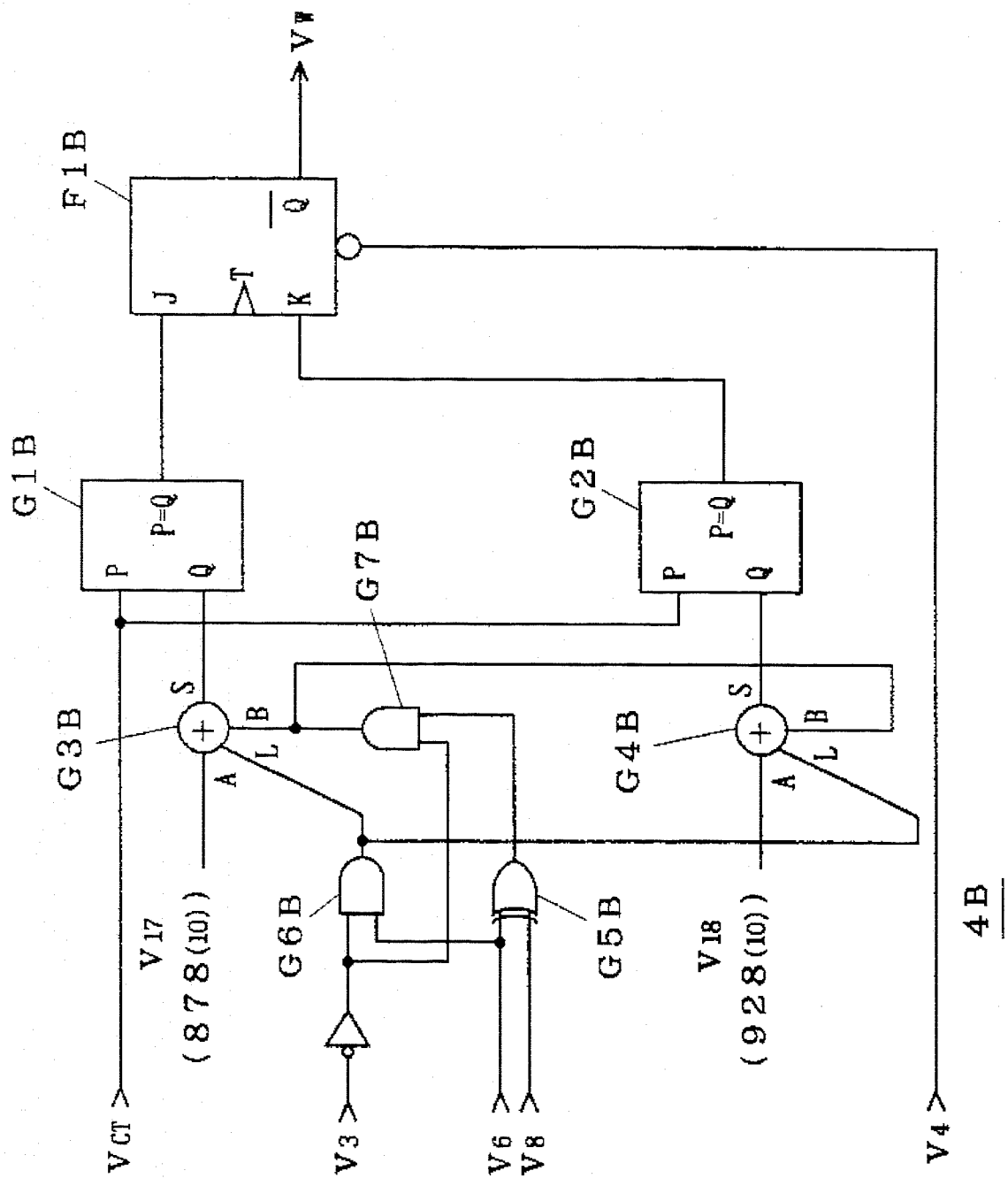
FIG. 20 is a circuit diagram of a window pulse generating circuit of the third preferred embodiment.

FIG. 20 illustrates a detailed circuit arrangement of the window pulse generating circuit 4B. P terminals of comparators G1B, G2B receive the counter output $V_{CT}$ like the first and second preferred embodiments.

Q terminals of the comparators G1B, G2B receive computed result outputs from adders G3B, G4B, respectively. Input terminals of the adders G3B, G4B receive signals indicative of standard values $V_{17}$ (count value 878) and $V_{18}$ (count value 928), respectively. The adders G3B, G4B also receive outputs from AND gates G6B, G7B.

When the horizontal phase judgement result $V_3$ indicates the standard signal flag (H), both of the AND gates G6B, G7B output $0_{(10)}$, and the adders G3B, G4B output the standard values $878_{(10)}$, $998_{(10)}$, respectively.

When the horizontal phase judgement result $V_3$ indicates the nonstandard signal flag (L), the feedback amount $V_8$ ($\Delta t_3 = k \times (\text{variation amount})$: $0 \leq k \leq 1$) is calculated in the feedback amount computing circuit 9 from the variation amount $V_7$ calculated in the phase variation amount computing circuit 8. The computed result $V_8$ is applied to an exclusive-OR gate G5B.

When the phase difference judgement result $V_6$ indicates a phase lead ("H"), the feedback amount $V_8$ applied to the exclusive-OR gate G5B is converted into one's complement. The converted value is applied to the adders G3B, G4B which in turn receives an "H" at their carry input terminals. Two complement computed results are outputted from the adders G3B, G4B, respectively.

When the phase difference judgement result $V_6$ indicates a phase lag ("L"), the feedback amount $V_8$ applied to the exclusive-OR gate G5B is outputted as it is to the adders G3B, G4B which in turn receive an "L" at their carry input terminals. Then the adders G3B, G4B output the results of addition of the standard values (878, 928) to the feedback amount $V_8$.

Operation after the data entered into the Q terminals of the comparators G1B, G2B are determined by the above mentioned control in the third preferred embodiment is similar to that in the first and second preferred embodiments. Then the window pulse signal $V_W$ is outputted from a $\overline{Q}$ terminal of a J–K flip-flop circuit F1B.

Figure 21:
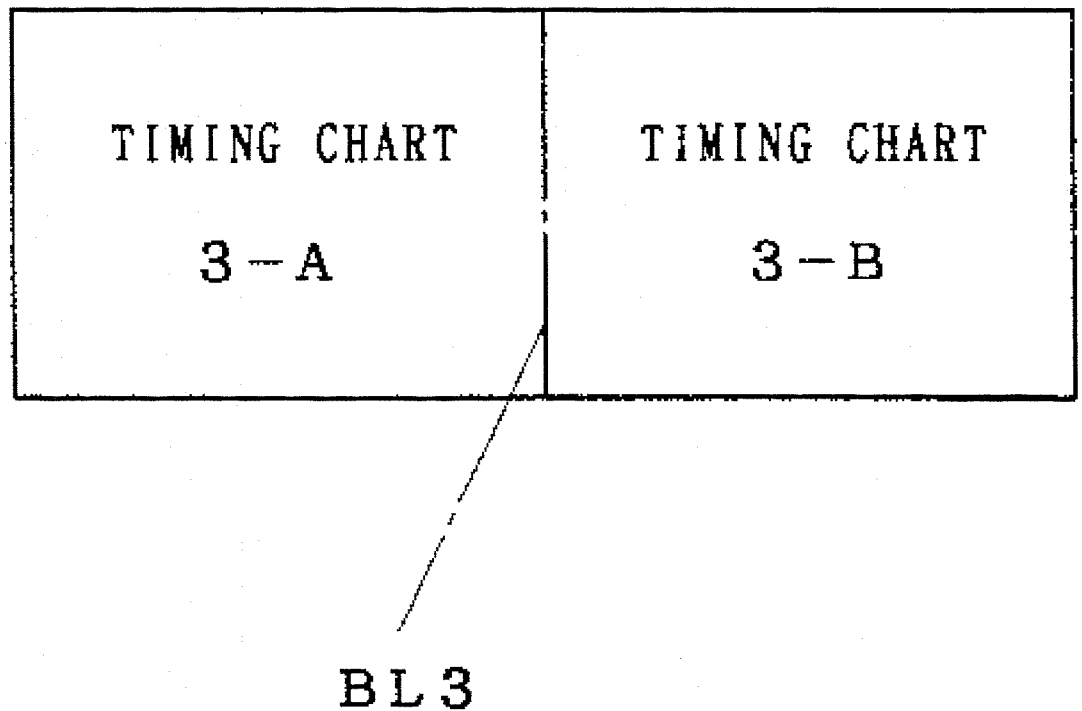
FIGS. 21, 22A–22K and 23A–23I are timing charts of the third preferred embodiment.
Figure 22:
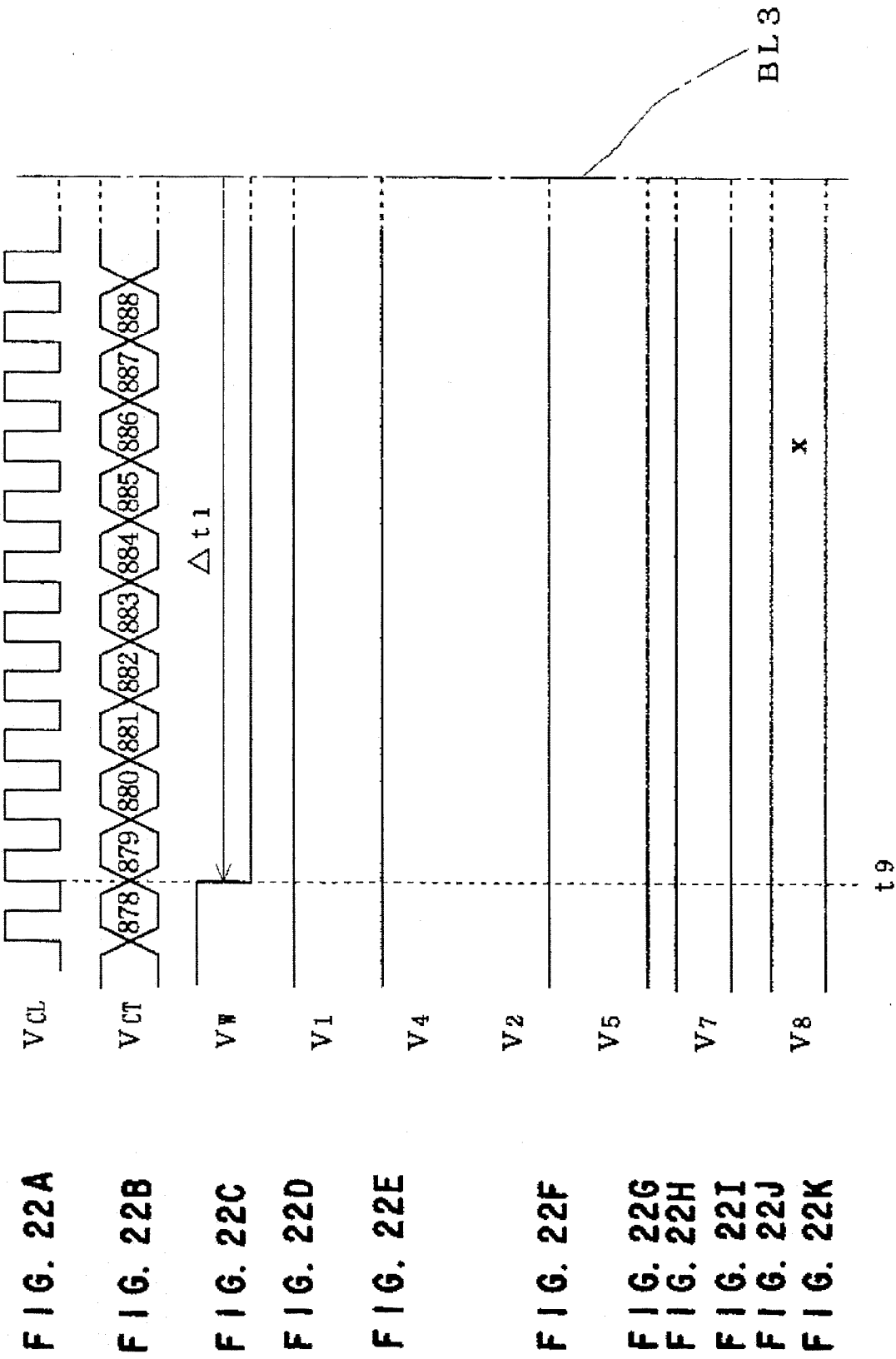
Figure 23:
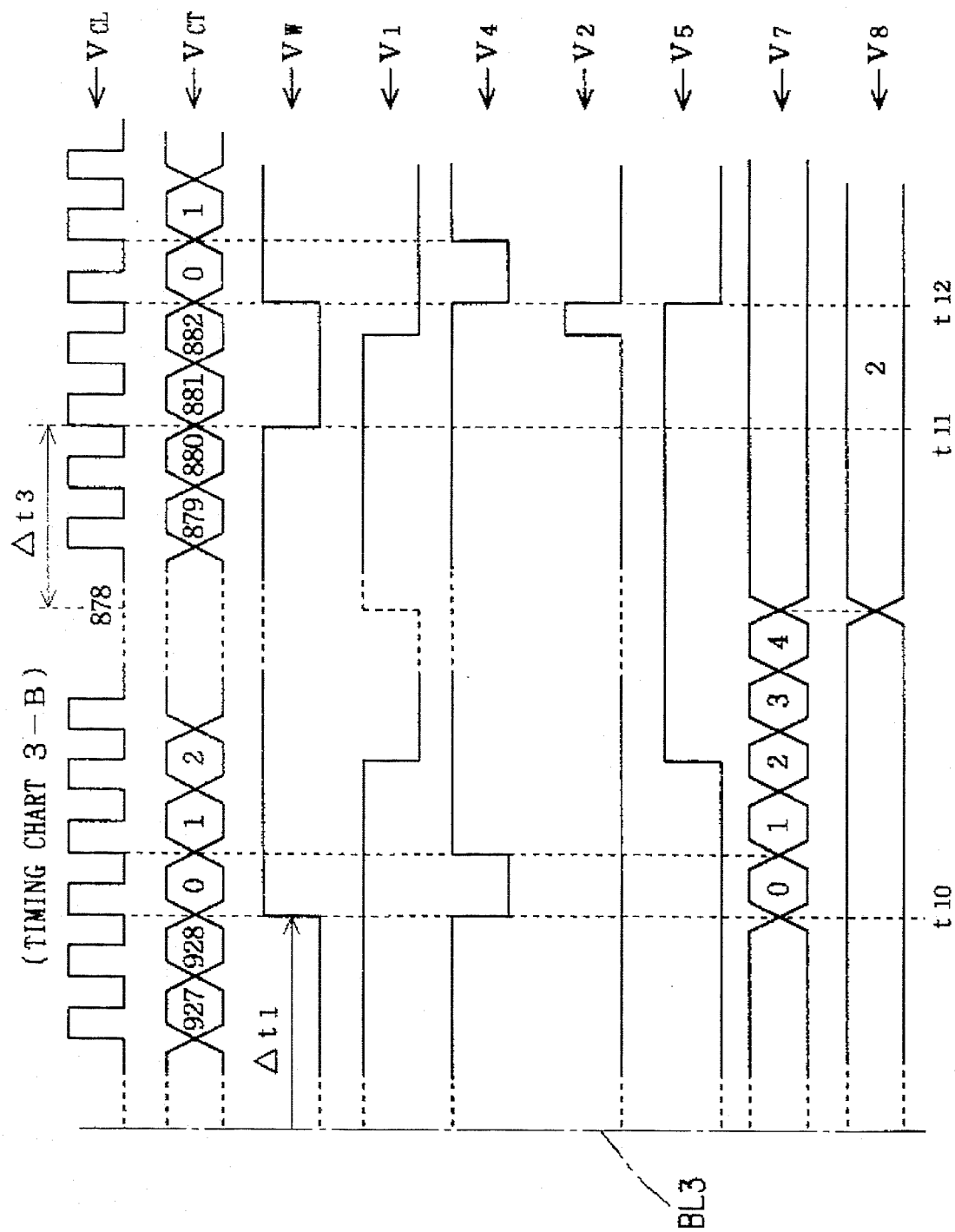
Figure 24:
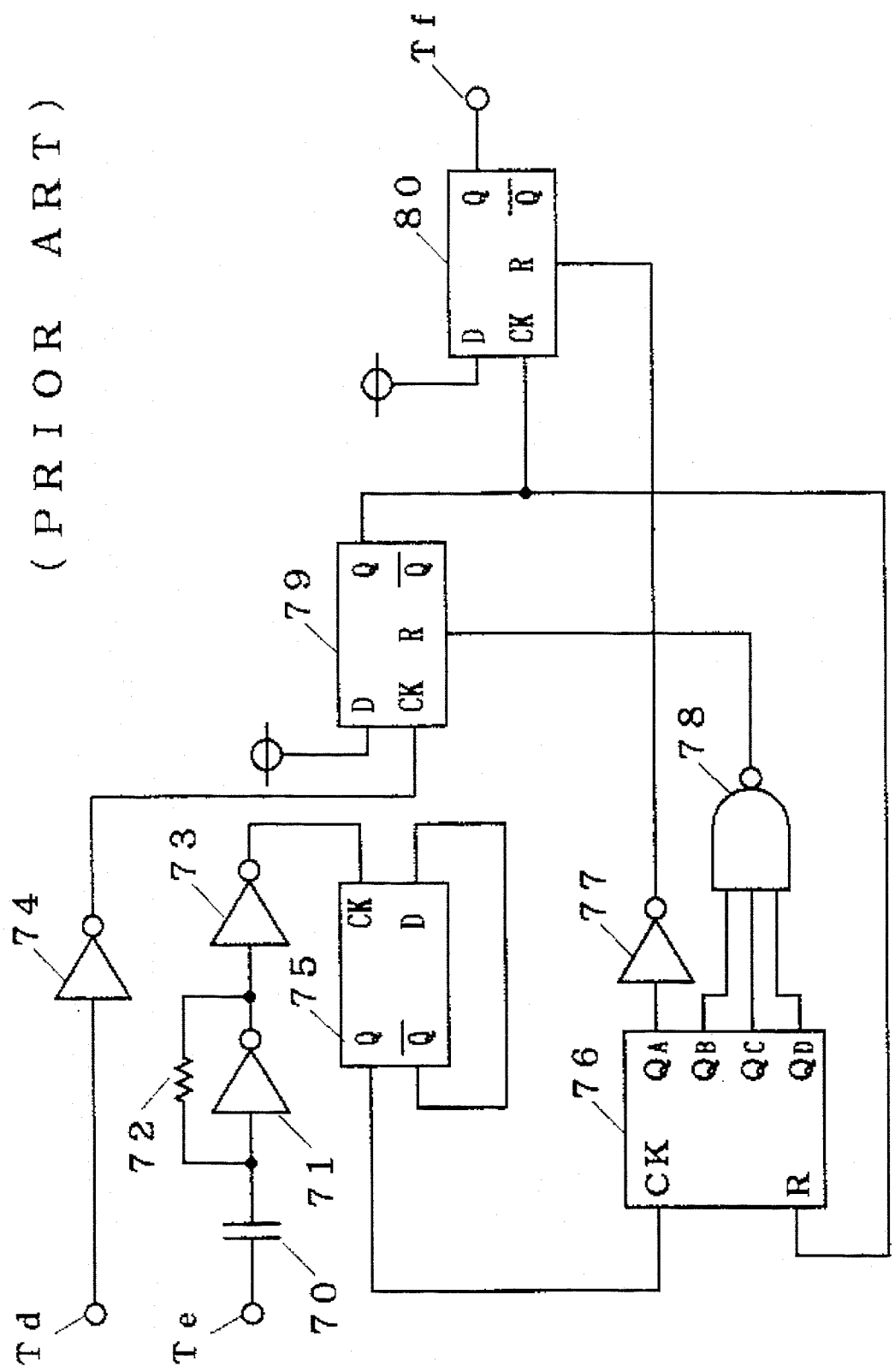
FIG. 24 is a circuit diagram of a conventional horizontal synchronizing signal generating circuit.

FIGS. 21, 22A–22K and 23A–23I are timing charts in the third preferred embodiment. FIG. 21 indicates that a timing chart is divided into two timing charts 3-A (FIG. 22) and 3-B (FIG. 23).

Referring to FIGS. 22A–22K and 23A–23I, the composite synchronizing signal $V_1$ is high for the time period $\Delta t_1$ between times $t_9$ and $t_{10}$ over which the window pulse signal $V_W$ is low. Thus the horizontal counter circuit 5 is reset when the counter output $V_{CT}$ reaches 928, and the internally generated horizontal synchronizing signal $V_4$ is outputted after time $t_{10}$. In this case, the count value corresponding to the third time period $\Delta t_3$ is set to +2 by the feedback amount $V_8$ and the signal $V_6$. Accordingly, the window pulse signal $V_W$ which is low is outputted at time $t_{11}$. The result is the ensured detection of the falling edge of the composite synchronizing signal $V_1$ within the time period over which the window pulse signal $V_W$ is low. After the time $t_{12}$, it is judged that the standard signal is entered, and the horizontal synchronizing signal $V_4$ is outputted which is provided by synchronizing the composite synchronizing signal $V_1$ with the reference clock $V_{CL}$. The horizontal synchronizing signal $V_4$ has a horizontal frequency conforming to the video synchronizing signal standards and is in phase with the composite synchronizing signal $V_1$.

In this fashion, the third preferred embodiment includes the phase variation amount computing circuit 8 and the feedback amount computing circuit 9 in addition to the circuit arrangement of the second preferred embodiment. This provides an improvement in such properties that the horizontal synchronizing signal $V_4$ to be generated follows the entered composite synchronizing signal $V_1$ over the second preferred embodiment when the entered composite synchronizing signal $V_1$ changes from the nonstandard signal to the standard signal.

While the invention has been shown and described in detail, the foregoing description is in all aspects illustrative and not restrictive. It is therefore understood that numerous modifications and variations can be devised without departing from the scope of the invention.

What is claimed is:

1. A horizontal synchronizing signal generating circuit comprising:

first input means for receiving a composite synchronizing signal;

second input means for receiving a reference clock;

judging means connected to said first input means for judging whether or not said composite synchronizing signal falls within a first time period determined so that the midpoint of said first time period is a falling edge of a standard horizontal synchronizing signal to output a judgement signal, said judgement signal indicating that said composite synchronizing signal is said standard horizontal synchronizing signal when said composite synchronizing signal falls, said judgement signal indicating that said composite synchronizing signal is a nonstandard horizontal synchronizing signal when said composite synchronizing signal does not fall;

internal signal generating means connected to said second input means and said judging means, said internal signal generating means synchronizing said composite synchronizing signal with said reference clock to output a horizontal synchronizing signal when said judgement signal indicates said standard horizontal synchronizing signal, said internal signal generating means generating said standard horizontal synchronizing signal to output said standard horizontal synchronizing signal as said horizontal synchronizing signal in response to said reference clock when said judgement signal indicates said nonstandard horizontal synchronizing signal; and output means connected to said internal signal generating means for outputting said horizontal synchronizing signal, wherein said standard horizonal synchronizing signal has a horizontal frequency determined by video synchronizing signal standards.

2. The horizontal synchronizing signal generating circuit of claim 1, wherein said internal signal generating means includes:

window pulse signal generating means connected to said second input means and triggered by a falling edge of said horizontal synchronizing signal to generate and output a window pulse signal in response to said reference clock, said window pulse signal being low over said first time period; and synchronizing signal generating means connected to said second input means, said judging means, said window pulse signal generating means, and said output means for outputting said horizontal synchronizing signal to said output means and said window pulse signal generating means, said outputted horizontal synchronizing signal being said composite synchronizing signal in synchronism with said reference clock when said judgement signal indicates said standard horizontal synchronizing signal, said outputted horizontal synchronizing signal being said standard horizontal synchronizing signal in synchronism with said window pulse signal when said judgement signal indicates said nonstandard horizontal synchronizing signal, and wherein said judging means is connected to said window pulse signal generating means and judges the falling edge of said composite synchronizing signal in response to said window pulse signal.

3. The horizontal synchronizing signal generating circuit of claim 2, wherein said synchronizing signal generating means includes:

a first horizontal synchronizing signal generating circuit portion responsive to said window pulse signal and said reference clock for synchronizing said composite synchronizing signal with said reference clock;

a second horizontal synchronizing signal generating circuit portion responsive to said window pulse signal and said reference clock for generating said standard horizontal synchronizing signal in synchronism with said reference clock; and selector means connected to said first and second horizontal synchronizing signal generating circuit portions and said judging means, said selector means selecting an output signal from said first horizontal synchronizing signal generating circuit portion when said judgement signal indicates said standard horizontal synchronizing signal, said selector means selecting an output signal from said second horizontal synchronizing signal generating circuit portion when said judgement signal indicates said nonstandard horizontal synchronizing signal, said selector means then outputting the selected signal as said horizontal synchronizing signal.

4. The horizontal synchronizing signal generating circuit of claim 2, wherein said window pulse signal generating means includes:

counter means connected to said second input means and said synchronizing signal generating means for counting said reference clock after being reset by said horizontal synchronizing signal; and a window pulse signal generating circuit connected to said counter means and said synchronizing signal generating means for starting outputting said window pulse signal when the count result equals a preset value after the falling edge of said horizontal synchronizing signal.

5. The horizontal synchronizing signal generating circuit of claim 4, further comprising:

phase difference detecting means connected to said first input means and said window pulse signal generating circuit for comparing both phases of said composite synchronizing signal and said window pulse signal to output a phase difference judgment signal indicative of the sign of a phase difference therebetween to said window pulse signal generating circuit, wherein said window pulse signal generating circuit stores a predetermined second time period and changes an output start timing of said window pulse signal by said second time period in response to said phase difference judgement signal.

6. The horizontal synchronizing signal generating circuit of claim 5, further comprising:

window pulse output timing correcting means connected to said phase difference detecting means and said window pulse signal generating circuit for determining the absolute value of the phase difference between said composite synchronizing signal and said window pulse signal and for determining a correction signal indicative of a third time period in accordance with the absolute value of said phase difference to output said correction signal to said window pulse signal generating circuit, wherein said window pulse signal generating circuit changes the output start timing of said window pulse signal by said third time period in response to said phase difference judgement signal and said correction signal.

7. The horizontal synchronizing signal generating circuit of claim 6, wherein said judging means includes:

horizontal synchronizing signal separating means connected to said first input means, said window pulse signal generating circuit, and said synchronizing signal generating means for outputting a separated horizontal synchronizing signal in synchronism with the falling edge of said composite synchronizing signal only when the falling edge of said composite synchronizing signal exists within said first time period; and a horizontal phase judging circuit connected to said horizontal synchronizing signal separating means, said window pulse signal generating circuit, and said synchronizing signal generating means and receiving said separated horizontal synchronizing signal for generating said judgement signal indicating that said composite synchronizing signal is said horizontal synchronizing signal in response to said window pulse signal to output said judgement signal to said synchronizing signal generating means.

8. The horizontal synchronizing signal generating circuit of claim 6, wherein said phase difference detecting means includes:

a horizontal synchronizing signal input timing detecting circuit connected to said first input means and said synchronizing signal generating means for detecting the falling edge of said composite synchronizing signal entered, after being subjected to an initial reset by the falling edge of said horizontal synchronizing signal, to output a horizontal synchronization flag signal indicating that said composite synchronizing signal is said horizontal synchronizing signal; and a phase detecting circuit connected to said horizontal synchronizing signal input timing detecting circuit and said window pulse signal generating circuit for comparing said horizontal synchronization flag signal with said window pulse signal to output said phase difference judgement signal, and wherein said window pulse output timing correcting means is connected to an output of said horizontal synchronizing signal input timing detecting circuit.

9. A horizontal synchronizing signal generating circuit for generating a horizontal synchronizing signal from an entered composite synchronizing signal and a reference clock, said horizontal synchronizing signal generating circuit comprising:

window pulse signal generating means for generating and outputting a window pulse signal in synchronism with said reference clock, said window pulse signal being low over a predetermined time period defined so that the midpoint of said predetermined time period is a falling edge of a standard horizontal synchronizing signal having a horizontal frequency determined by video synchronizing signal standards;

judging means for comparing said entered composite synchronizing signal with said window pulse signal to judge whether or not a falling edge of said composite synchronizing signal exists within said predetermined time period; and synchronizing signal generating means, when said judging means judges that it does not, for generating said standard horizontal synchronizing signal in response to said reference clock and said window pulse signal to output said standard horizontal synchronizing signal as said horizontal synchronizing signal, wherein said window pulse signal generating means starts generating said window pulse signal in response to said horizontal synchronizing signal outputted from said synchronizing signal generating means.

10. The horizontal synchronizing signal generating circuit of claim 9, further comprising:

first correction signal generating means for detecting the sign of a phase difference between said composite synchronizing signal and said window pulse signal to output a first correction signal indicative of the detection result to said window pulse signal generating means, wherein said window pulse signal generating means corrects an output timing of said window pulse signal in response to said first correction signal to generate and output said window pulse signal, and wherein said synchronizing signal generating means, when said judging means judges that it exists, synchronizes said entered composite synchronizing signal with said reference clock to output said horizontal synchronizing signal.

11. The horizontal synchronizing signal generating circuit of claim 10, further comprising:

second correction signal generating means for determining the amount of the phase difference between said composite synchronizing signal and said window pulse signal to output a second correction signal to said window pulse signal generating means, said second correction signal indicating the amount of correction of the output timing of said window pulse signal in accordance with said amount of the phase difference, wherein said window pulse signal generating means corrects the output timing of said window pulse signal in response to said first and second correction signals to generate and output said window pulse signal.

* * * * *